US010981465B2

(12) United States Patent
Ishigaki et al.

(10) Patent No.: US 10,981,465 B2
(45) Date of Patent: *Apr. 20, 2021

(54) SYSTEM, AND METHOD FOR SWAPPING SELF DRIVING ENERGY MODULE FOR AN ENERGY MANAGEMENT SYSTEM

(71) Applicant: KABUSHIKI KAISHA TOYOTA CHUO KENKYUSHO, Aichi-ken (JP)

(72) Inventors: Masanori Ishigaki, Ann Arbor, MI (US); Tomoki Nishi, Ann Arbor, MI (US); George Bucsan, Belleville, MI (US)

(73) Assignee: KABUSHIKI KAISHA TOYOTA CHUO KENKYUSHO, Aichi-ken (JP)

( * ) Notice: Subject to any disclaimer, the term of this patent is extended or adjusted under 35 U.S.C. 154(b) by 64 days.

This patent is subject to a terminal disclaimer.

(21) Appl. No.: 15/694,429

(22) Filed: Sep. 1, 2017

(65) Prior Publication Data

US 2019/0070967 A1    Mar. 7, 2019

(51) Int. Cl.
*B60L 53/80* (2019.01)
*G05D 1/02* (2020.01)
(Continued)

(52) U.S. Cl.
CPC .............. *B60L 53/80* (2019.02); *B60L 8/003* (2013.01); *B60L 50/64* (2019.02); *B60L 53/16* (2019.02);
(Continued)

(58) Field of Classification Search
CPC ...... B60L 11/1822; B60L 50/64; B60L 50/66; B60L 53/12; B60L 53/14; B60L 53/38;
(Continued)

(56) References Cited

U.S. PATENT DOCUMENTS

2007/0251132 A1* 11/2007 Luoma .................. G09F 9/33
40/541
2009/0082957 A1* 3/2009 Agassi ..................... B60L 3/12
701/532
(Continued)

FOREIGN PATENT DOCUMENTS

CN    101992753 A    3/2011
CN    103661303 A    3/2014
(Continued)

OTHER PUBLICATIONS

Englsih Translation for refernce FR2989522A1 (Year: 2013).*

*Primary Examiner* — Rachid Bendidi
(74) *Attorney, Agent, or Firm* — Oblon, McClelland, Maier & Neustadt, L.L.P.

(57) ABSTRACT

A system includes energy modules that output power to an energy management bus based on load demands. An energy module includes energy cells enclosed within a module housing that provide power to the energy management bus and a driving system attached to the module housing that transports the energy module. The energy module includes a local controller that controls power output from the energy cells to the energy management bus, engages a self-driving mode in response to receiving a disconnection signal from a central controller, and controls movement of the energy module in the self-driving mode to a predetermined location via the driving system. The central controller receives a current module status from the energy modules and controls a configuration of the energy modules providing power to the energy management bus based on the current module status.

20 Claims, 22 Drawing Sheets

(51) Int. Cl.
*B60L 53/16* (2019.01)
*B60L 53/36* (2019.01)
*B60L 58/12* (2019.01)
*B60L 50/64* (2019.01)
*H02J 7/00* (2006.01)
*B60L 58/18* (2019.01)
*B60L 8/00* (2006.01)
*H02J 7/34* (2006.01)
*H02J 7/35* (2006.01)
*H02J 50/12* (2016.01)
*H02J 1/08* (2006.01)

(52) U.S. Cl.
CPC ............ *B60L 53/36* (2019.02); *B60L 58/12* (2019.02); *B60L 58/18* (2019.02); *G05D 1/0278* (2013.01); *H02J 7/0044* (2013.01); *H02J 7/342* (2020.01); *B60L 2210/10* (2013.01); *B60L 2240/60* (2013.01); *B60L 2240/70* (2013.01); *B60L 2260/32* (2013.01); *G05D 2201/0213* (2013.01); *H02J 1/082* (2020.01); *H02J 7/35* (2013.01); *H02J 50/12* (2016.02)

(58) Field of Classification Search
CPC ......... B60L 53/60; B60L 53/80; B60L 58/21; B60L 2260/32; B60S 5/06; G05D 1/0225; G05D 1/021; H02K 11/33; H02K 7/108; H02K 7/14; H02K 9/06; H02K 2213/12; Y02T 10/641; Y02T 10/7016; Y02T 10/7061; Y02T 10/7072; Y02T 90/121; Y02T 90/122; Y02T 90/124; Y02T 90/125; Y02T 90/128; Y02T 90/14; Y02T 90/163

See application file for complete search history.

(56) References Cited

U.S. PATENT DOCUMENTS

| | | | |
|---|---|---|---|
| 2010/0071979 A1* | 3/2010 | Heichal | B60K 1/04 180/68.5 |
| 2010/0168934 A1* | 7/2010 | Ball | A63B 55/61 701/2 |
| 2011/0084658 A1* | 4/2011 | Yamamoto | B60L 5/005 320/108 |
| 2012/0286730 A1 | 11/2012 | Bonny | |
| 2015/0280465 A1* | 10/2015 | Lin | H02J 7/007 320/137 |
| 2016/0221543 A1* | 8/2016 | Corfitsen | B60S 5/06 |
| 2017/0151881 A1* | 6/2017 | Lee | B60L 11/1822 |
| 2017/0163073 A1* | 6/2017 | Neander | B60L 58/30 |
| 2017/0371331 A1* | 12/2017 | Cameron | B60K 7/0007 |

FOREIGN PATENT DOCUMENTS

| | | | |
|---|---|---|---|
| EP | 0 014 176 B1 | 12/1982 | |
| EP | 1 481 838 A2 | 12/2004 | |
| FR | 2 989 522 A1 | 10/2013 | |
| FR | 2989522 A1 * | 10/2013 | ............ H01M 10/02 |
| WO | WO 00/58139 | 10/2000 | |
| WO | WO 2011/134463 A2 | 11/2011 | |

* cited by examiner

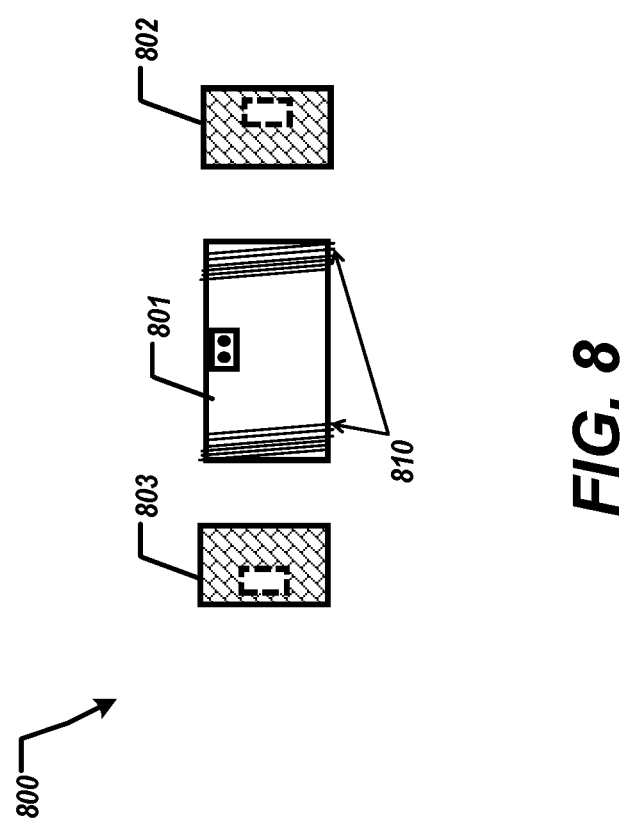

SYSTEM, AND METHOD FOR SWAPPING SELF DRIVING ENERGY MODULE FOR AN ENERGY MANAGEMENT SYSTEM

BACKGROUND

Energy management systems in hybrid vehicles (HVs) and electric vehicles (EVs) include energy modules that provide power to a vehicle drive train and electric loads of the vehicle. U.S. Patent Application Publication 2012/0286730 to Bonny describes an automatic recharging robot for electric and hybrid vehicles that is housed in an underside of a vehicle and is configured to automatically navigate to a detected compatible recharging station.

SUMMARY

In an exemplary implementation, a system can include energy modules that output power to an energy management bus based on load demands. An energy module can include one or more energy modules configured to output power to an energy management bus based on load demands. An energy module of the one or more energy modules includes one or more energy cells enclosed within a module housing configured to provide the power to the energy management bus. The energy module further includes a driving system including a front wheel, at least one rear wheel, and a motor attached to the module housing that are configured to transport the energy module, and a local controller with first circuitry. The first circuitry is configured to control an amount of power output from the one or more energy cells to the energy management bus, engage a self-driving mode of the energy module in response to receiving a disconnection signal from a central controller, and control movement of the energy module in the self-driving mode to a predetermined location via the motor of the driving system; and the central controller including second circuitry configured to receive a current module status from the one or more energy modules, and control a configuration of the one or more energy modules providing power to the energy management bus based on the current module status.

A process includes controlling, via first circuitry of a local controller, an amount of power output from one or more energy cells enclosed within a module housing of an energy module of one or more energy modules to an energy management bus of an electrical system, engaging, via the first circuitry, a self-driving mode of the energy module in response to receiving a disconnection signal from a central controller, controlling, via the first circuitry, movement of the energy module in the self-driving mode to a predetermined location via the motor of the driving system attached to the module housing that are configured to provide rotational movement for the energy module, receiving, at second circuitry of a central controller, a current module status from the one or more energy modules, and controlling a configuration of the one or more energy modules providing power to the energy management bus based on the current module status received from the one or more energy modules.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 8 is an exemplary illustration of an energy module application according to an aspect of the present disclosure;

DETAILED DESCRIPTION

Figure 1:
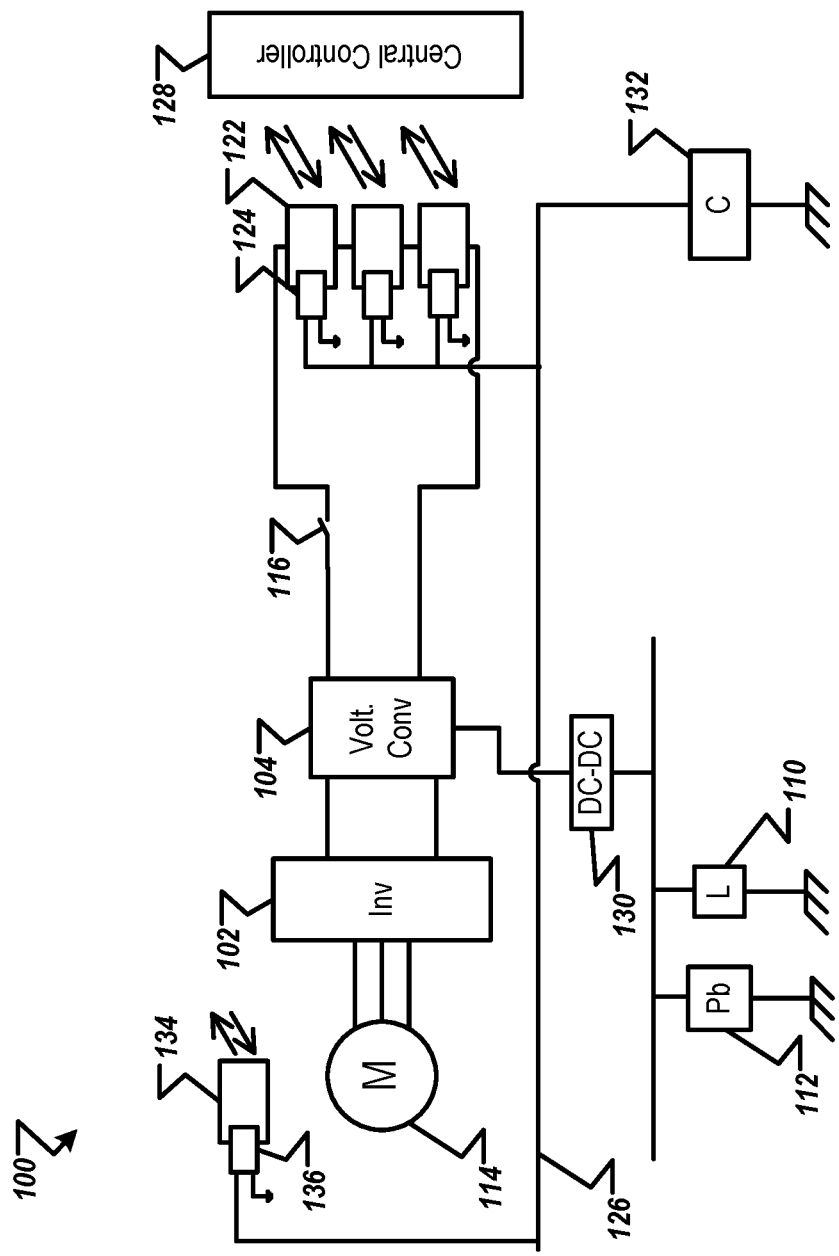
FIG. 1 is an exemplary schematic diagram of a modular energy management system according to an aspect of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

FIG. 1 is an exemplary illustration of a modular energy management system 100 that can be implemented in a hybrid vehicle (HV) or electric vehicle (EV). The energy management system 100 controls transfer of electric energy from one or more energy sources to an inverter 102 and motor 114 as well as one or more electrical loads 110 of the vehicle. Throughout the disclosure, the inverter 102 and motor 114 are interchangeably referred to as the vehicle drive train. The modular energy management system 100 includes at least one battery module 122 that provides power to inverter 102 and motor 114 via voltage converter 104 and high voltage relay 116. In some implementations, the high voltage relay 116 includes at least one switch aligns power to the vehicle drive train based on a control signal from a central controller 128. In addition, the at least one battery module 122 is an energy module that includes at least one battery cell, a local controller, and a modular isolated DC-DC converter 124 that converts the DC voltage from the battery module 122 to an energy management bus 126. In some implementations, the modular isolated DC-DC converter 124 converts a higher DC voltage at the at least one battery module 122 to a lower voltage at an energy management bus 126. The modular isolated DC-DC converter 124 can be part of the battery module 122 or can be external to the battery module 122. In addition, the modular isolated DC-DC converter 124 can be configured for wireless power transfer so that power can be wirelessly transferred between the at least one battery module 122 and the energy management bus 126. The at least one battery module 122 can be connected in series or parallel based on the power specifications of the modular energy management system 100.

The central controller 128 and local controllers for each of the at least one battery module 122 manage the power output from the at least one battery module 122 as well as power demands of the one or more electrical loads 110 to provide droop control for the energy management bus 126. In addition, the local controllers for the at least one battery module 122 communicate information to the central controller 128 that includes diagnostic information, state of charge (SOC), rate of discharge, and the like. Details regarding operation of the central controller 128 and local controllers are discussed further herein.

In some implementations, the energy management bus 126 is a DC bus that connects the at least one battery module 122 to the one or more electrical loads 110 via a DC-DC converter 130. In some aspects, the DC-DC converter 130 is a non-isolated DC-DC converter that can perform DC-DC conversion at higher speeds than isolated DC-DC converters. The DC-DC converter 130 can convert a higher DC voltage at the energy management bus 126 to a lower voltage that corresponds to the voltage of the one or more electrical loads 110.

In addition, a power storage device 132 is also connected to the energy management bus 126. In some implementations, the power storage device 132 can be a capacitor, an electric double layer capacitor (EDLC), a lithium-ion capacitor, or any other type of power storage device. The type of power storage device 132 used in the modular energy management system 100 can be based on rates of power transfer and how much of an effect power transients have on the energy management bus 126. The power storage device 132 can reduce the effects of power transients that occur at the energy management bus 126 and assist in maintaining an approximately constant average voltage at the energy management bus 126. In some aspects, the effects of power transients on the energy management bus 126 can be referred to as "peaky power." By reducing the effects of peaky power on the energy management bus 126, the power storage device 132 reduces stresses on the at least one battery module 122 and the Pb battery 112.

For example, power demands of the one or more electrical loads 110 can vary based on the number of energized loads, load settings, and the like. As the load demands on the modular energy management system 100 change, a response time by the modular isolated DC-DC converter 124 of the at least one battery module 122 that is slower than the increase in load demand may cause power transients to develop at the energy management bus 126. Stored energy from the power storage device 132 can be output to reduce the magnitude of the power transients. The power storage device 132 can also absorb excess power as load demands on the modular energy management system 100 are reduced. The modular energy management system 100 also includes a lead (Pb) battery 112 that also supplies power to the one or more electrical loads 110. In some implementations, the modular energy management system 100 also includes the solar energy module 134 that is connected to the energy management bus 126 via the modular DC-DC converter 136. In some implementations, the modular DC-DC converter c136 can be configured to perform wireless power transfer. The solar energy module 134 can provide power to the one or more electrical loads 110 via the DC-DC converter 130.

Figure 2A:
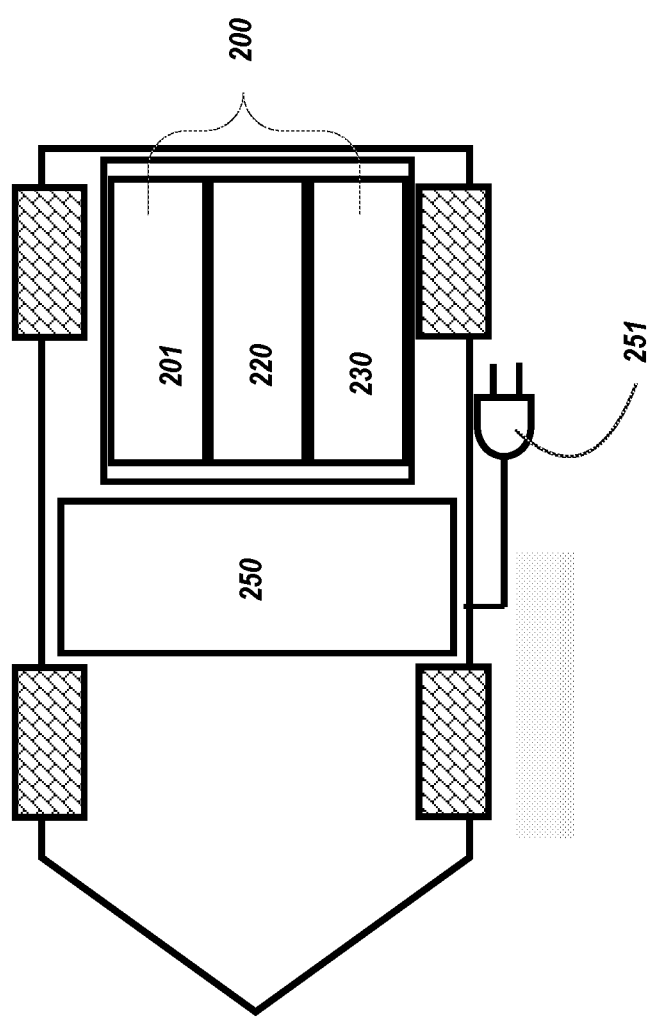
FIG. 2A is an exemplary illustration of an energy module according to an aspect of the present disclosure.

FIG. 2A is an exemplary illustration of an energy module 200 that provides power to the modular energy management system 100. For example, the energy module 200 can be an implementation of the battery module 122 described previously (FIG. 1). The energy module 200 can include one or more drone battery module such as drone battery modules 201, 220 and 230. Furthermore, in one implementation, the energy module 200 can include at least one non-drone battery module 250. In the present disclosure, the drone battery modules 201, 220, and 230 are interchangeably referred to as the energy module 200. Also, it can be understood that other references to drone battery modules herein (e.g., modules 201, 220, 230, 300, 501, 511, 512, 513, 700C, 700D, 700E, etc.) include the components of the energy module 200 and can be referred to interchangeably with the energy module 200.

A non-drone battery module 250 can includes a battery that is installed within a vehicle and does not include a driving mechanism. The battery of the non-drone battery module 250 can be a power-type battery that provides high power output (e.g., greater than 100kW) but has a short driving range (e.g., 30 miles). The non-drone battery module 250 can be charged using a plug 251 which can be plugged in any power outlet to receive electric energy. To charge the non-drone battery 250, the vehicle should be parked close to a power outlet as the non-drone battery modules are heavy and typically not removed from the vehicle for charging.

The drone battery module 201 (or 220/230) can include one or more batteries, a driving mechanism and a local controller that controls the charging of the one or more batteries as well as the driving mechanism. The drone battery module 201 is a self-driving module that can locate a charging location and configured to plug itself to charge the drone battery module 201. The drone battery module 201 has a longer driving range (e.g., more than 50 miles) compared to the non-drone battery module 250, hence referred as energy-type battery modules. The purpose of energy-type battery is to increase the driving range of the vehicle by compromising the power output of the vehicle, while the purpose of the power-type battery can be to meet the power demand of the vehicle and provide increased power to the vehicle that may include compromising the driving range of the vehicle.

Accordingly, an electric vehicle (EV) or a hybrid vehicle (HV) with the energy module 200 including both the drone battery module 201 and the non-drone battery module 250 can provide increased driving range via the drone battery module 201, as well as meet power demand via the battery module 250. In addition, the drone battery modules 201, 220 and 230 can provide improved flexibility of charging one or more of the batteries while using remaining batteries for driving. Also, the non-drone battery module 250 and the drone battery modules 201, 220 and 230 can be configured to improve a vehicle balance, for example, by configuring the energy module 200 as shown in FIG. 2A, where the heavier non-drone battery module 250 is located approximately at a center of the vehicle and the drone battery modules 201, 220 and 230 are located at a rear end of the vehicle. Furthermore, the drone battery modules 201, 220 and 230 can be retro-fitted in any electric or hybrid vehicle to improve the driving range. In such retro-fitted vehicle, the pre-installed batteries provide redundancy, which may be desirable to account for increase power demand or driving range.

Figure 2B:
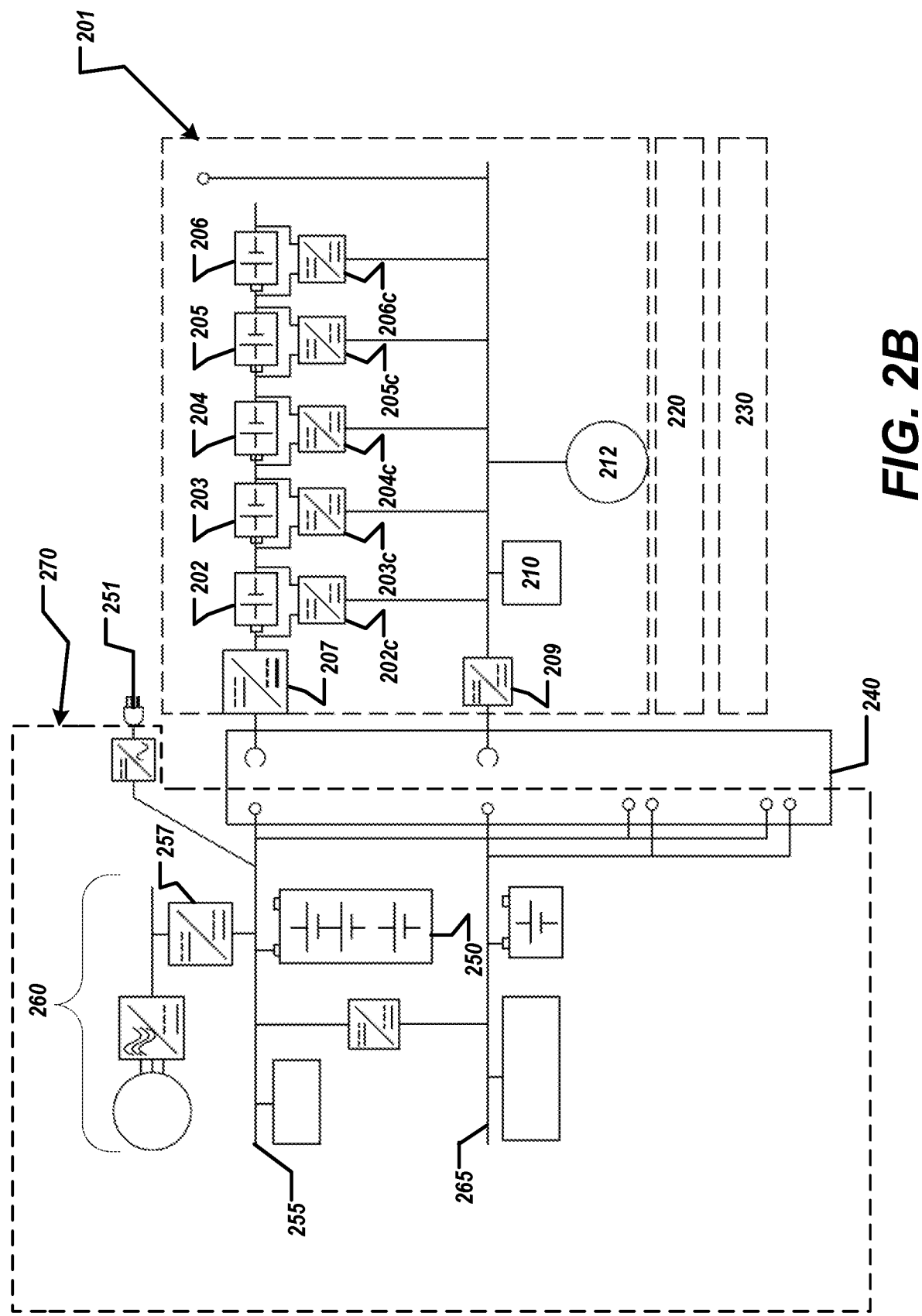
FIG. 2B is a schematic diagram of the energy module according to an aspect of the present disclosure.

FIG. 2B is a schematic diagram of the energy module 200 including the drone battery module 201 and the non-drone battery module 250. The drone battery module 201 includes five series connected batteries (e.g., batteries 202, 203, 204, 205, and 206) that provide energy to the vehicle via a DC-DC converter 207. Each battery within the drone battery module 201 can be approximately 48V, which provides a total of approximately 250V at an input to a DC-DC converter 207 that outputs a voltage of, for example, approximately 300V to the high voltage bus (HV) 255 to provide power to the driving system 260 of the vehicle. The drone module 201 can also include an additional DC-DC converter 209 that converts the total voltage of the drone battery module 201 from approximately 250V to a lower voltage, for example, approximately in the range of 10V to 14V for the LV bus 265. Each battery (202, 203, 204, 205, and 206) within the drone module 201 has a DC-DC converter (e.g., 202c, 203c, 204c, 205c, and 206c) to compensate for a SOC balance of each battery and also provide power to the driving system 260 or other electrical/electronic devices of the vehicle through the DC-DC converter 257. The batteries 202, 203, 204, 205, and 206 also provide power to a local controller 210 within the drone battery module 201, as well as power to a drone driving system 212 that drives the drone battery module 201. The local controller 210 can be referred to interchangeably as a controller 210.

The local controller 210 includes suitable logic and circuitry that locally controls operations of the energy module 200. References to various types of circuitry of the controller 210 (e.g., monitoring circuitry, communication circuitry, power transfer circuitry, drive control circuitry, etc.) refer to software instructions stored in memory that are executed by a processor of the controller 210.

For example, the controller 210 includes monitoring circuitry that receives sensor data from one or more sensors (not illustrated) installed in the energy module 200 that can include voltage sensors, current sensors, temperature sensors, and any other type of sensor that allows the controller 210 to determine a current status of the energy module 200. For example, the current status on the energy module 200 can include a state of charge (SOC), state of health (SOH), or current operation mode of each of the drone battery modules 201, 220 and 230 of the energy module 200. In some implementations, the SOH of each of the drone battery modules 201, 220 and 230 of the energy module 200 or an overall SOH charge of the energy module 200 is percentage indicating how close various measured parameters correspond to specifications of the energy module 200. For example, the measured parameters that are used to determine the SOH can include internal impedance (e.g., resistance, inductance, or capacitance), capacity, voltage, self-discharge, ability to accept a charge, or number of charge-discharge cycles that have been performed.

In some aspects, the controller 210 of the energy module 200 outputs a replacement status signal to a central controller 128 of the modular energy management system 100 (e.g., central controller 128 in FIG. 1) when predetermined replacement criteria for the energy module 200 are met. The predetermined replacement criteria can include a predetermined SOC threshold or SOH threshold. For example, the controller 210 outputs the replacement status signal to the central controller 128 when the SOC of the energy module 200 is less than the SOC threshold. In addition, the controller 210 can output the current status of the energy module 200 to the central controller 128 at a predetermined frequency, and the central controller 128 can determine when the predetermined replacement criteria are met. Based on the predetermine replacement criteria, the one or more of the drone battery modules 201, 220 and 230 can be undocked from the docking station 240 and navigated to a predetermine location such as a charging station for charging.

The controller 210 also includes communication circuitry that allows the controller 210 to communicate with other devices, such as the central controller 128 of the modular energy management system 100, a cloud-based module monitoring system, a charging station, other energy modules, or a module chassis that stores at least one of the energy module 200 and connects the at least one energy module to the modular energy management system 100. The communication circuitry can include transceivers, antennas, and associated circuitry that provide for wireless communication between the controller 210 and the other devices via one or more wireless communication protocols. The wireless communication protocols can include WI-FI, cellular communication (e.g., 3G, 4G, LTE, GSM, etc.), Bluetooth, Bluetooth low energy (BLE), or any other wireless communication technology that is known. For example, the controller 210 can locate a position of a charging station by establishing a Bluetooth or BLE link with the charging station. In addition, the controller 210 can communicate with the cloud-based module monitoring system via a cellular network connection.

The controller 210 also includes power transfer control circuitry that control transfer of energy out of or into the energy module 200. In some implementations, the energy module 200 has a corresponding DC-DC power conversion circuit (e.g., modular isolated DC-DC power converter 124 in FIG. 1) that transfers energy between energy modules (e.g., between 250 and 201, or between 201 and 202) or between the energy management bus (e.g., energy management bus 126 in FIG. 1) and the energy module 200. The controller 210 of the energy module 200 can output control signals to the DC-DC power conversion circuit to control a direction of power transfer and a rate of power transfer based on the current status of the energy module 200 or a control signal received from the central controller 128. In some implementations, the energy module 200 includes electrical terminals that electrically connect the energy module 200 to the energy management bus. In some aspects, the terminals include a wireless power transceiver that provides for wireless power transfer between the energy module 200 and the energy management bus 126.

The controller 210 also includes drive control circuitry that controls the operation of the drone battery modules 201 of the energy module 200 as well as self-navigation of the energy module 200. In some implementations, the controller 210 is configured to determine an operational mode for the energy module 200 based on control signals received from the central controller 128 of the energy management system 100, detected beacon signals from charging stations, etc. For example, one operational mode of the energy module 200 is a self-driving mode where the controller 210 navigates the energy module 200 to a predetermined location such as a charging station. Throughout the disclosure, references to navigating or navigation of the energy module 200 refer to independent control of movement of the energy module 200 by the controller 210 that can include determining a direction and speed of motion and controlling operation of the drone battery module 201 to achieve the determined direction and speed of motion. In a navigation sub-mode of the self-driving mode, the controller 210 navigates the energy module 200 to a charging station or a location other than the module chassis. In a repositioning sub-mode of the self-driving mode, the controller 210 navigates the energy module 200 to another docking position within the docking station 204 or the module chassis. The controller 210 can also operate the energy module 200 in other operational modes, such as a power transfer mode or a charging mode. The controller 210 also outputs control signals to actuators of the driving system 212, such as actuators that control clutch engagement, and/or rotation speed of a motor, steering of the energy module 200 based on the operational mode and a predetermined location to which the energy module 200 is navigating, such as a charging station or other docking position location within the docking station 204 or the module chassis. Details regarding the operation of the energy module 200 in the various operational modes are discussed further herein.

The controller 210 and thus the energy module 200 can operate independently of the central controller 128 of the energy management system 100, which provides flexibility with respect to changing out energy modules for charging operations, using the energy module 200 for multiple applications, and the like. For example, the energy module 200 can provide power to other types of energy management systems, such as electric systems of small vehicles or buildings. Throughout the disclosure, several implementations of the energy module 200 are described. It can be understood that other references to drone battery modules herein (e.g., modules 201, 220, 230, 300, 501, 511, 512, and 513) include the components of the energy module 200 and can be referred to interchangeably with the energy module 200.

The drone battery modules 201, 220 and 230 are connected in parallel at a docking station 240. The docking station 240 can be any device that establishes an electrical connection between an electrical system 270 of the vehicle via the HV bus 255 and the LV bus 265 and the drone battery modules 201, 220 and 230.

The drone battery modules 220 and 230 have similar configuration as the drone battery module 201, discussed above. Each of the drone battery modules 201, 220 and 230 can be operated independently, particularly for charging purposes when undocked from the docking station 240. In addition, each of the drone battery modules 201, 220 and 230 can also be controlled by the central controller 128 when docked in the docking station 240 to provide or extract power from the drone battery modules in an efficient manner based on the driving conditions or other driving related parameters.

The drone battery module 201 can also include a universal port to provide a connection site to a solar panel or another type of device that can be connected to the drone battery module 201, further discussed with respect to FIGS. 16, and 17A-17C.

According to one implementation of the present disclosure, the energy module 200 includes three drone battery module 201 and the non-drone battery 250. In another implementation, the energy module 200 can include one or more drone battery modules and no non-drone battery module depending on the user preference, intended use of the vehicle, or other similar factors. For example, for a short distance driving and low power requirement an energy module can include only two drone battery module, while for a long driving range on a highway, the energy module can include five drone battery module and one non-drone battery module.

Figure 2C:
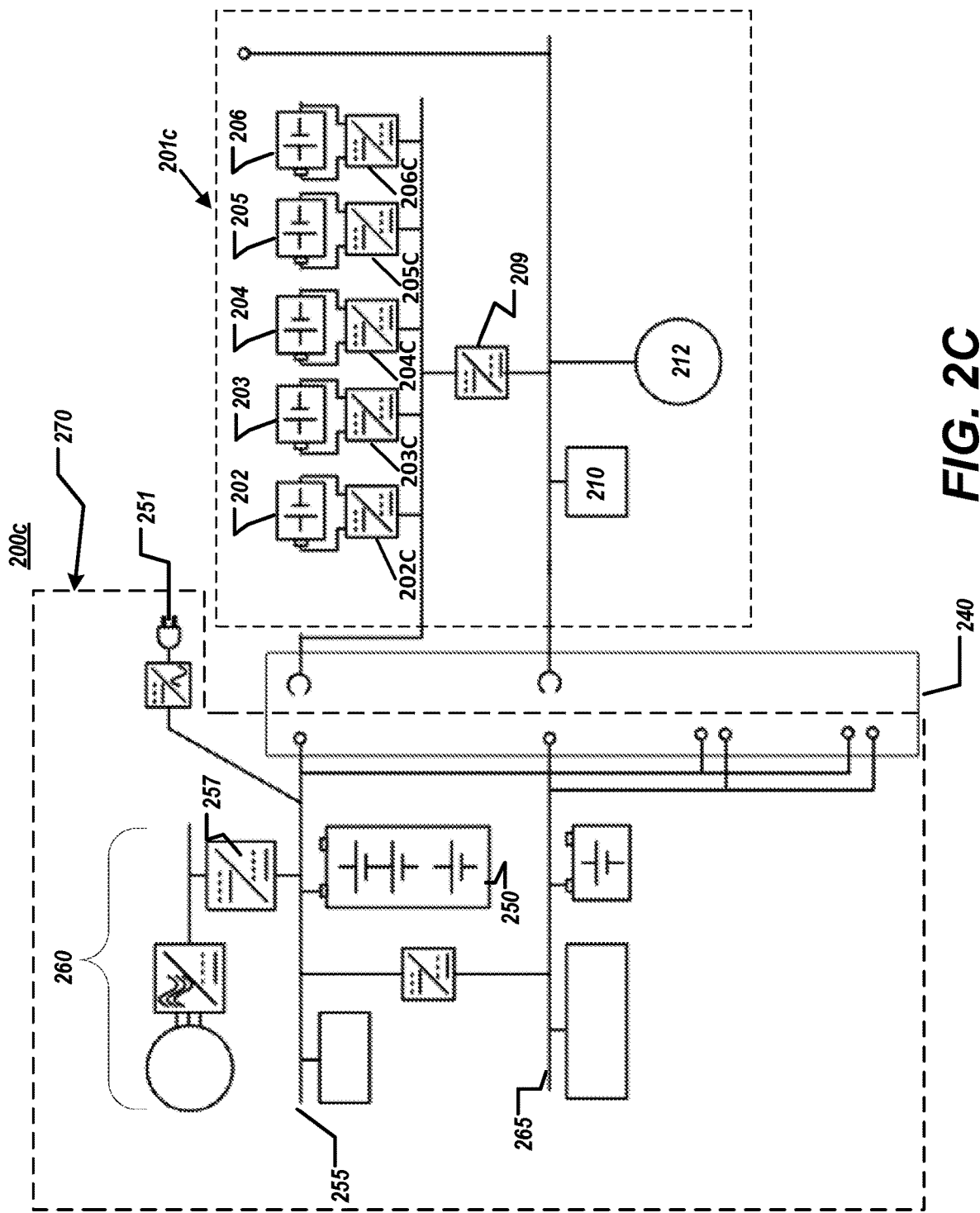
FIG. 2C is a schematic diagram of the energy module according to another aspect of the present disclosure.

FIG. 2C is an exemplary schematic diagram of the of an energy module 200c including the drone battery module 201c and the non-drone battery module 250. In FIG. 2C the same reference numbers are used for devices that are the same as those described above with reference to FIG. 2B. In FIG. 2C, the batteries 202, 203, 204, 205, and 206 of the drone battery module 201c are connected in parallel instead of in series as in the drone battery module 201 of FIG. 2B. Each battery 202, 203, 204, 205, and 206 is connected to a corresponding DC-DC converter 202C, 203C, 204C, 205C, and 206C, which convert the voltages of the batteries to another voltage as described above with reference to FIG. 2B. An additional converter 209 then converts the total battery voltage to a suitable voltage for the docking station 240 as discussed above. Note that because the batteries 202, 203, 204, 205, and 206 are connected in parallel instead of series the additional converter 207 of FIG. 2B can be omitted. Thus, the energy module 200c reduces the number of DC-DC converters needed, but the DC-DC converters used in the energy module 200c require higher power capability. Otherwise, the functioning of the energy module 200c is substantially similar to the functioning of the energy module 200 discussed above, and further explanation is therefore omitted for brevity. Also, though not shown in FIG. 2C, the energy module 200c may include multiple drone battery modules 201c without departing from the scope of the present disclosure.

Figure 3:
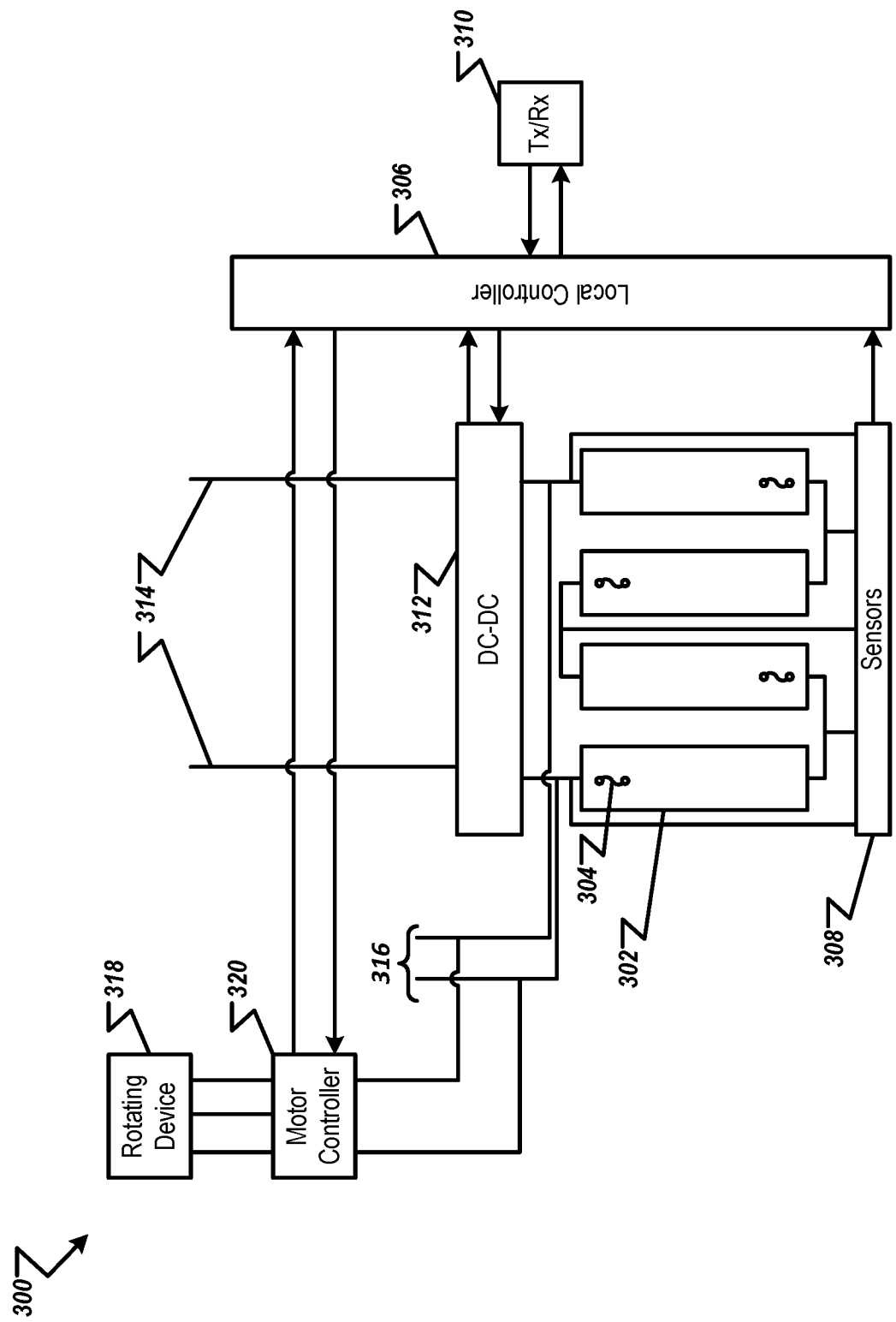
FIG. 3 is an exemplary schematic diagram of an energy module according to an aspect of the present disclosure.

FIG. 3 is another exemplary electrical schematic diagram energy module 300, which is an implementation of the energy module 200 described previously. The energy module 300 described by FIG. 3 is a battery module, such as the battery module 122 in the modular energy management system 100. Energy modules having other types of power sources can also be included in the modular energy management system 100. For example, solar energy modules, AC charging modules, fuel cell modules, and the like, are other types of energy modules that can be included in the modular energy management system 100. The energy module 300 includes at least one source cell 302, such as a battery (e.g., battery 202 in FIG. 2), a modular DC-DC converter 312, a local controller 306 with a transceiver 310, and sensor devices 308. In some implementations, the modular DC-DC converter 312 is included as part of the energy module 300, but can also be external to the energy module 300.

In some implementations, the local controller 306 is an implementation of the controller 210 described previously (FIG. 2). The power transfer circuitry of the local controller 306 receives voltage-power (V-P) maps and other information from the central controller 128 of the modular energy management system 100 that indicates how energy module 300 is configured and operates with respect to the modular energy management system 100. The local controller 306 also reads the voltage at an energy management bus 126, and issues control signals to align the modular DC-DC converter 312 to achieve an output power that corresponds to the received V-P map. The modular DC-DC converter 312 can be an isolated or a non-isolated DC-DC converter. The local controller 306 also receives sensor values from at least one sensor device 308 that can include temperature, voltage, current, SOC, SOH, and other indications related to the at least one source cell 302. The at least one sensor device can also determine if at least one fuse 304 within the at least one source cell 302 has received a trigger event to shut down the at least one source cell 302. For example, the at least one internal fuse 304 can be set to trip on overcurrent, high temperature, overload, and the like. In some implementations, the local controller 306 includes a memory to save the V-P map information received from the central controller 128 and the sensor values received from the at least one sensor device 308.

The local controller 306 communicates with the central controller 128 of the modular energy management system 100 via transceiver 310 and associated communication circuitry. The transceiver 310 can include at least one transmitter and receiver antenna to receive signals from the central controller 128 and transmit signals to the central controller 128. For example, the local controller 306 can transmit diagnostic information via the transceiver 310 to the central controller 128 related to the energy module 300 and can receive V-P map information from the central controller 128. The transceiver can also be implemented as separate transmitter and receiver devices according to some implementations. The local controller 306 can also communicate with other devices via one or more wireless communication protocols. The wireless communication protocols can include WI-FI, cellular communication (e.g., 3G, 4G, LTE, GSM, etc.), Bluetooth, Bluetooth low energy (BLE), or any other wireless communication technology that is known. For example, the local controller 306 can locate a position of a charging station by establishing a Bluetooth or BLE link with the charging station. In addition, the local controller 306 can communicate with the cloud-based module monitoring system via a cellular network connection.

Output signal 314 from the modular DC-DC converter 310 is sent to the energy management bus to maintain continuous power to one or more electrical loads of the modular energy management system 100. In some implementations, a high voltage output signal 316 can be output from the energy module 300 upstream of the DC-DC converter 312 to provide power to the vehicle drive train. For example, the high voltage output signal 316 can be connected in series with high voltage output signals from other energy modules to provide power to the vehicle drive train components. In addition, the high voltage output signal can provide power to a motor controller 320, which provides power to a rotation device 318, such as the motor of the local driving system 212 (in FIG. 2) of the energy module 200. Also, the local controller 306 outputs control signals to the motor controller 320 to control the speed and direction of rotation of the rotating device 318.

Figure 4:
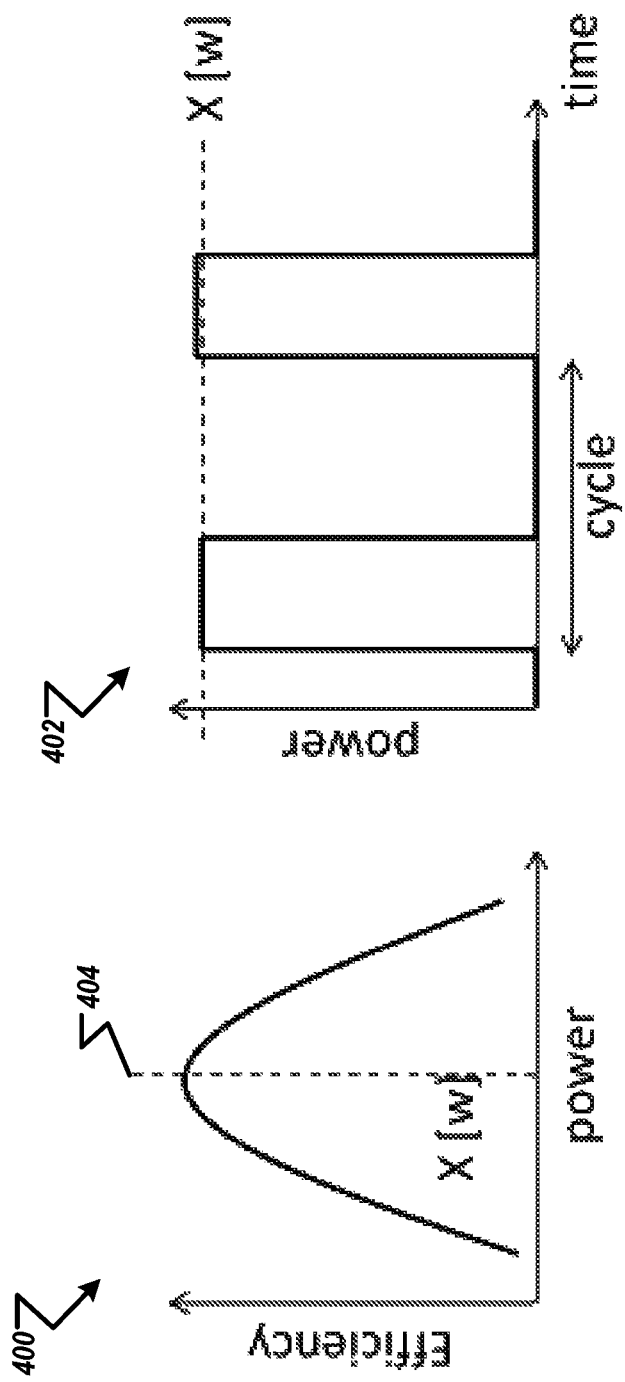
FIG. 4 is an exemplary graph of output power and efficiency for an energy module according to an aspect of the present disclosure.

FIG. 4 includes exemplary graphs of efficiency 400 and output power 402 for an energy module, such as the energy module 300 (FIG. 3). In some implementations, the local controller 306 can control an amount of power output by the energy module 300 based on an efficiency profile for the energy module, which may be stored in the memory of the local controller 306. The energy module 300 can be configured to output a predetermined amount of power that corresponds to a highest operating efficiency for the energy module 300, such as at point 404 of the graph 400. The graph 402 illustrates how the local controller 306 can be configured to implement duty cycle control to modify the amount of power output from the energy module 300 to be as close to the highest operating efficiency for the energy module 300 as possible. Using duty cycle control to modify the amount of output power can be beneficial in wireless power transfer implementations where magnetic resonance wireless power transfer devices operate with sharp efficiency curves.

Figure 5:
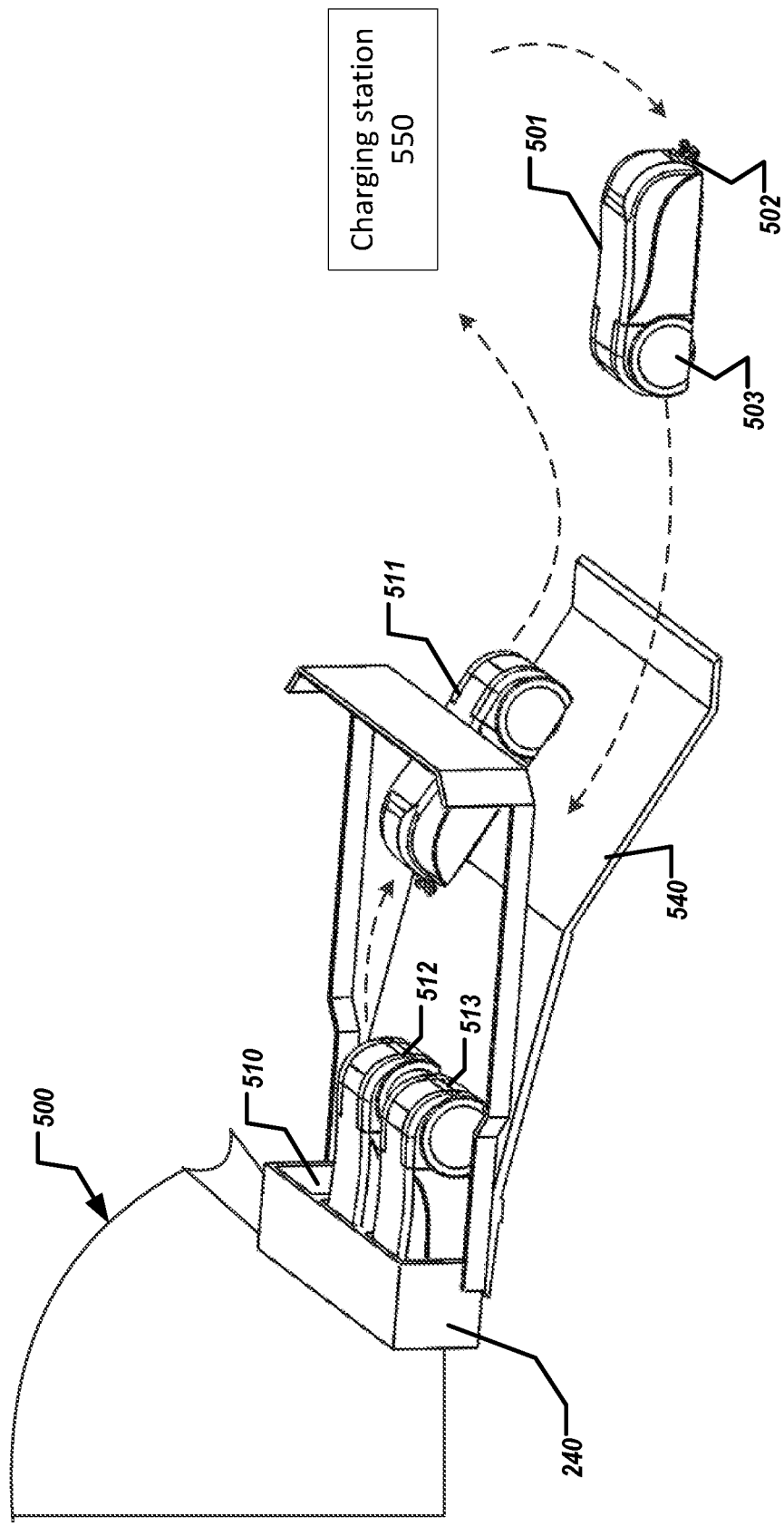
FIG. 5 is an exemplary illustration of the energy modules being swapped according to an aspect of the present disclosure.

FIG. 5 is an exemplary illustration of the energy modules 501, 511, 512, and 513, which are an implementation of the energy module 200 discussed throughout the present disclosure, installed in a vehicle 500. One or more of the energy module modules 501, 511, 512, and 513 can be docked in the docking station 240, each energy module being in a self-driving mode, a docked mode, a battery swapping mode, or the like.

When the self-driving mode or the battery swapping mode of the one or more energy module 511, 512, and 513 is activated by the central controller 128 or the local controller (which can be an implementation of the local controller 210 discussed earlier) due to, for example, a low charge, the energy module can be undocked from the docking station 240. Upon undocking, the controller or the central controller 128 can open a ramp 540 around the docking station 240. The ramp 540 provides a drive surface, for example, to drive the energy module 511 down to a ground level or the energy module 501 up to the docking station 240.

In FIG. 5, the energy module 511 is undocked from a slot 510 and self-driven to a charging station 550 for charging based on the instructions from the local controller and using the local driving system (which can be an implementation of the local driving system 212 discussed earlier) of the energy module 511. Similarly, another energy module 501 which is fully charged can be navigated to the docking station 240 and docked in the slot 510, thus automatically swapping the energy module 511 having a low charge for the drone battery module 501 that is fully charged.

The local driving system of the energy module 501 can include motors driving wheels 502 and 501 and a steering mechanism (not illustrated) to change direction of travel. The motor and the steering mechanism can receive instructions from the local controller (which can be an implementation of the controller 210 discussed earlier) of the drone battery module 501 to navigate to a predetermined location. Such local driving system can be desired because the energy module 501 can be heavy (i.e., more than 30 kg) for a person to move the energy module 501 to a predetermined location (e.g., a charging station).

The docking station 240 can be installed in the vehicle 500, such as in an aft portion of a vehicle undercarriage or in a trunk space of the vehicle 500. The docking station 240 includes one or more docking positions for the energy modules (e.g., energy module 200 in FIG. 2) of the modular energy management system 100. For example, the docking station 240 has three docking positions that house three energy modules 511, 512 and 513. In some implementations, each of the docking positions in the docking station 240 includes one or more electrical terminals (not illustrated in FIG. 5) that electrically connect the one or more energy modules to the energy management bus 126 of the modular energy management system 100. In some implementations, the electrical terminals provide a wired connection between the energy modules and the energy management bus. The electric terminals can also include a wireless power transceiver configured to wirelessly transfer power between the one or more energy modules and the energy management bus in addition to or instead of the wired connection. The electric terminals also include circuitry for communicating with the central controller 128 as well as the energy modules. For example, the electric terminals can output a Bluetooth or BLE beacon signal that is detected by the energy modules navigating to a predetermined docking position in the docking station 240.

The docking station 240 also includes the ramp 540 that is automatically controllable by the central controller 128 of the modular energy management system 100. For example, the central controller 128 can output a control signal to engage an actuator to open the ramp 540 based on predetermined opening criteria. For example, the predetermined opening criteria can include receiving a module replacement signal from one of the energy modules, determining that the vehicle 500 is within a predetermined distance of a module charging station 550, and determining that the vehicle 500 is in a parked state or the engine is off, the central controller 128 issues a control signal to open the ramp 540 of the docking station 240. When in an open position, the ramp 540 provides a driving surface between the docking station 240 and a predetermined location for the one or more energy modules operating in the self-driving mode, such as a module charging station. In addition, the central controller 128 outputs a control signal to engage an actuator to close the ramp 540 based on predetermined closing criteria. The predetermined closing criteria can include determining that a predetermined number of energy modules are in one or more of the docking positions and are electrically connected to the energy management bus via the electric terminals.

In some aspects, in response to determining that the ramp 540 around the docking station 240 has reached the open position, the central controller 128 can output control signals to the energy modules to configure the energy management system 100 for module replacement and/or repositioning. For example, if energy module 511 has met the predetermined replacement criteria, the ramp 540 is open, and the modular energy management system 100 has been configured for standby operations, the central controller 128 issues the disconnection signal to the energy module 511 along with a control signal to engage a self-driving mode in order to navigate to a charging station. In response to receiving the control signals, the energy module 511 disconnects from the energy management bus 126 and engages the navigation sub-mode of the self-driving mode.

In the navigation sub-mode, the local controller of the energy module 201 receives location information about the charging station or other predetermined location which the energy module 201 is navigating. The location information can include a detected beacon signal from the charging station that the energy module 511, a control signal received from the central controller 128 about the position of the charging station, and/or position coordinates of the charging station received from the central controller 128 or cloud-based energy module monitoring system. In some implementations, the local controller of the energy module includes positioning circuitry, such as a global positioning system (GPS) receiver that allows the local controller to determine the location of the charging station based on the received position coordinates. When the self-driving mode is engaged, the local controller issues control signals to the local driving system. For example, the local controller can send signal to activate a clutch mechanisms of connecting the motor to the wheel. The local controller also controls the speed and direction of rotation of each of the wheel in order to steer the energy module 511 to the charging station or other predetermined location.

Energy module 501 represents an energy module operating in the self-driving mode that is navigating to one of the docking positions in the docking station 240. For example, the energy module 501 may be a replacement energy module and/or charged energy module that is navigating to docking station 240 from the charging station. The energy module 501 also navigates to the docking station 240 based on received location information about the docking station 240 and/or predetermined docking position to which the energy module 501 is assigned. In some implementations, the central controller 128 determines the predetermined docking position for the energy module 501 based on a current module status of other energy modules providing power to the energy management system 100 as well as power demands of the electrical loads supplied by the modular energy management system 100. When the predetermined docking position is determined, the central controller 128 outputs a control signal to trigger the electric terminals of the predetermined docking position to output a beacon signal that is detected by the energy module 501. The local controller 210 of the energy module 501 controls navigation of the energy module 501 to the predetermined docking position based on the detected beacon signal from the electric terminals for the predetermined docking position. Once the energy module 501 has reached the predetermined docking position, the energy module 501 is electrically connected to the energy management bus 126 via the electric terminals.

Based on the configuration of the energy modules in the docking station 240, one or more of the energy modules may have to be repositioned within the docking station 240 in order to provide a path for another energy module to navigate out of the docking station 240 or into a predetermined docking position in the docking station 240. For example, if energy module 512 has met the predetermined replacement criteria and has received the disconnection signal from the central controller 128, then the central controller 128 also outputs a repositioning control signal to energy module 501 in order to provide a path of travel for the energy module. For example, in response to receiving the repositioning control signal, the energy module 501 engages a repositioning sub-mode of the self-driving mode. While in the repositioning sub-mode, the energy module 501 exits the docking station 240 via the driving surface provided by the ramp 540 and subsequently navigates back to a predetermined docking position in the docking station 240 once the energy module 512 has exited the docking station 240. The energy modules stored in the docking station 240 can also be manually removed/disconnected or replaced/connected from the docking station 240.

The charging station 550 can be at any type of public or private location, such as office buildings, gas stations, grocery stores, shopping malls, hotels, car dealers, mechanic garages, private residences, and the like. The charging station 550 can include an AC charging device that can charge various types of energy modules. For example, the energy module 511 can be one of the energy modules that provide power to a modular energy management system 100 of a vehicle, such as the vehicle 500. The charging station 550 can include a charging connector that attaches to the energy module 511. The charging station 550 can also be configured to wirelessly charge the energy module 511.

In response to receiving the disconnection signal and/or self-driving mode engagement signal from the central controller 128, the energy module 511 navigates to the charging station 550 and establishes a connection with the charging station 550 at a predetermined time. In some implementations, the energy module 511 navigates to the charging station 550 based on received location information, such as through a detected beacon signal output from the charging station 550. In some implementations, the cloud-based energy module monitoring system can communicate a charging connection time to the energy module 511 directly or via the central controller 128 of the modular energy management system 100. The charging connection time can correspond to a time where grid energy costs are lowest or less than a predetermined threshold cost. As will be discussed in further detail herein, the cloud-based energy module monitoring system receives energy grid cost information from locations of one or more charging stations and can determine time periods where a cost to charge the energy module 511 is lowest. Once charging operations are complete, the energy module 511 disconnects from the charging station and navigates to a predetermined location, such as back to the module chassis of the vehicle or to a module storage location.

Figure 6A:
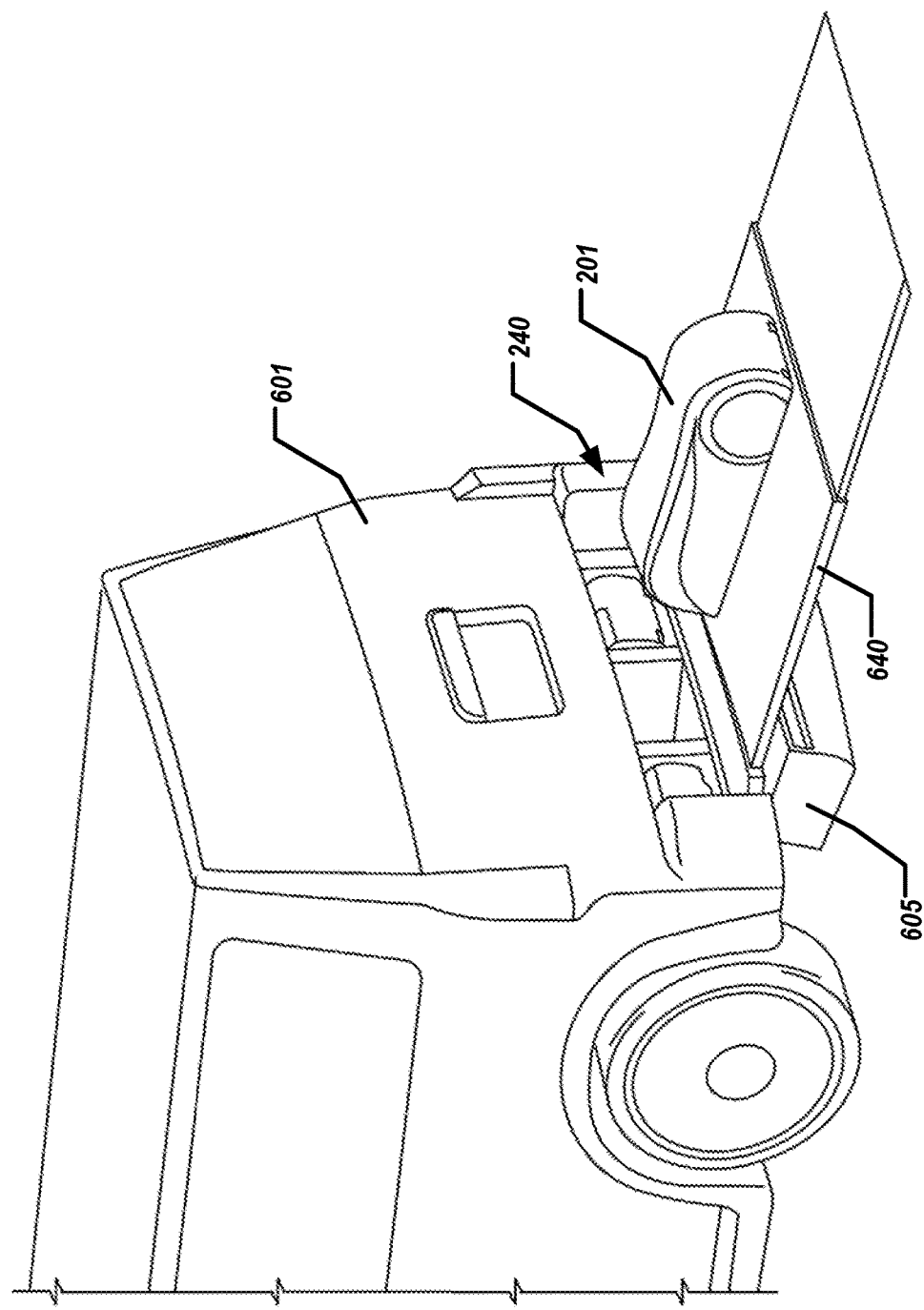
FIG. 6A is an example of a docking station built-in a vehicle according to an aspect of the present disclosure.

FIG. 6A is an exemplary the docking station 240 built-in a vehicle 600 (e.g., a under a trunk) behind a bumper cover 605. The docking station 240 can be configuration to fit under the trunk because EVs do not have exhaust systems at the back of the vehicle, which provides space for adding the docking station. Also, a ramp 640 (an implementation of ramp 540) can function automatically much like a wheelchair ramp in a handicapped vehicle. Note that in such built-in configuration, a trunk door 601 of the vehicle may not be opened during a battery swapping mode.

Figure 6B:
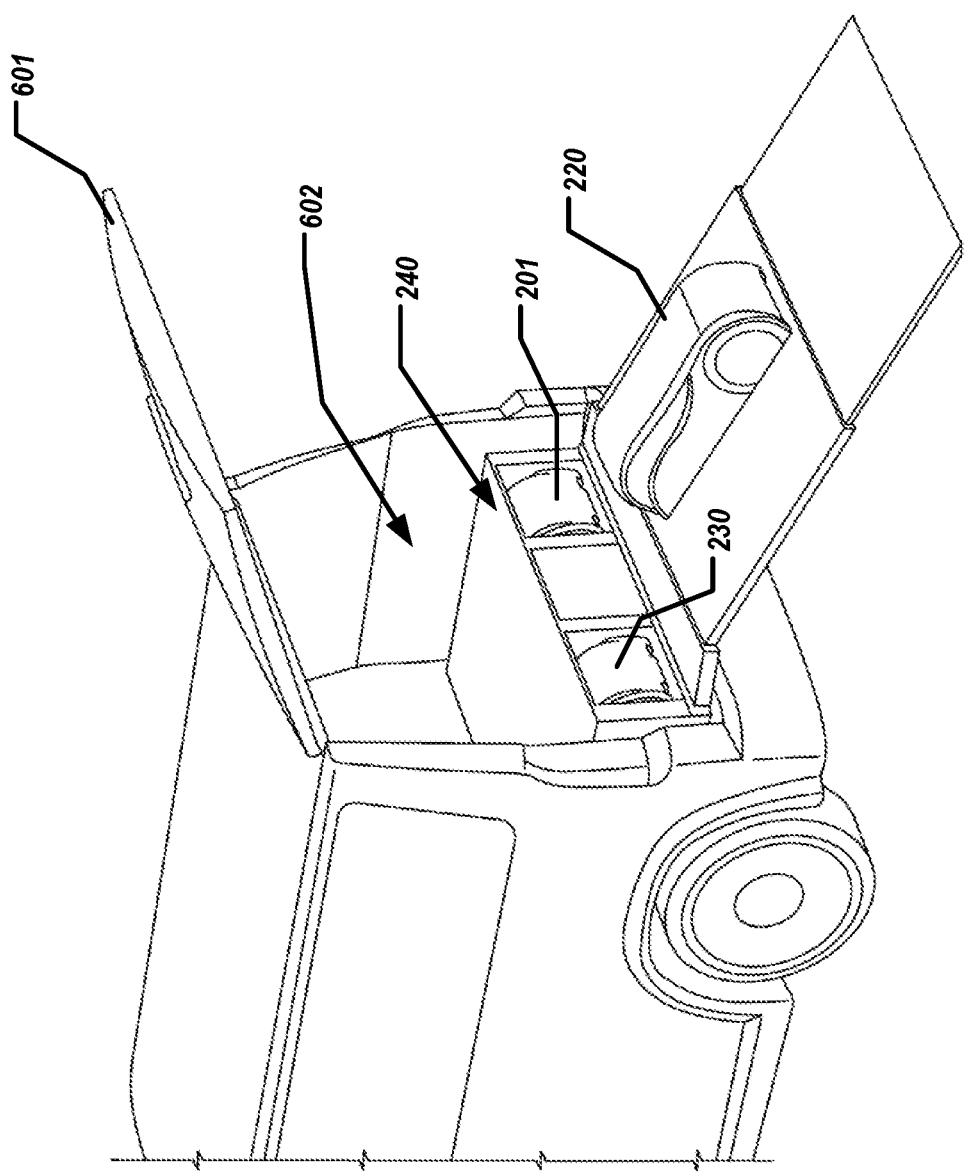
FIG. 6B is another exemplary configuration of an add-on docking station according to an aspect of the present disclosure.

FIG. 6B is another exemplary configuration of the docking station 240 where the docking station 240 takes up a part of a trunk space 602 of the vehicle. Such configuration can be used to for a HV, where the HV includes a system already designed for a specific power train and includes a pre-installed battery. The drone battery modules 201, 220 and 230 can be included with an add-on docking station to increase the electric driving range. Such a docking station configuration may include instruction to open the trunk door 601 separately from the ramp to the docking station.

Figure 7A:
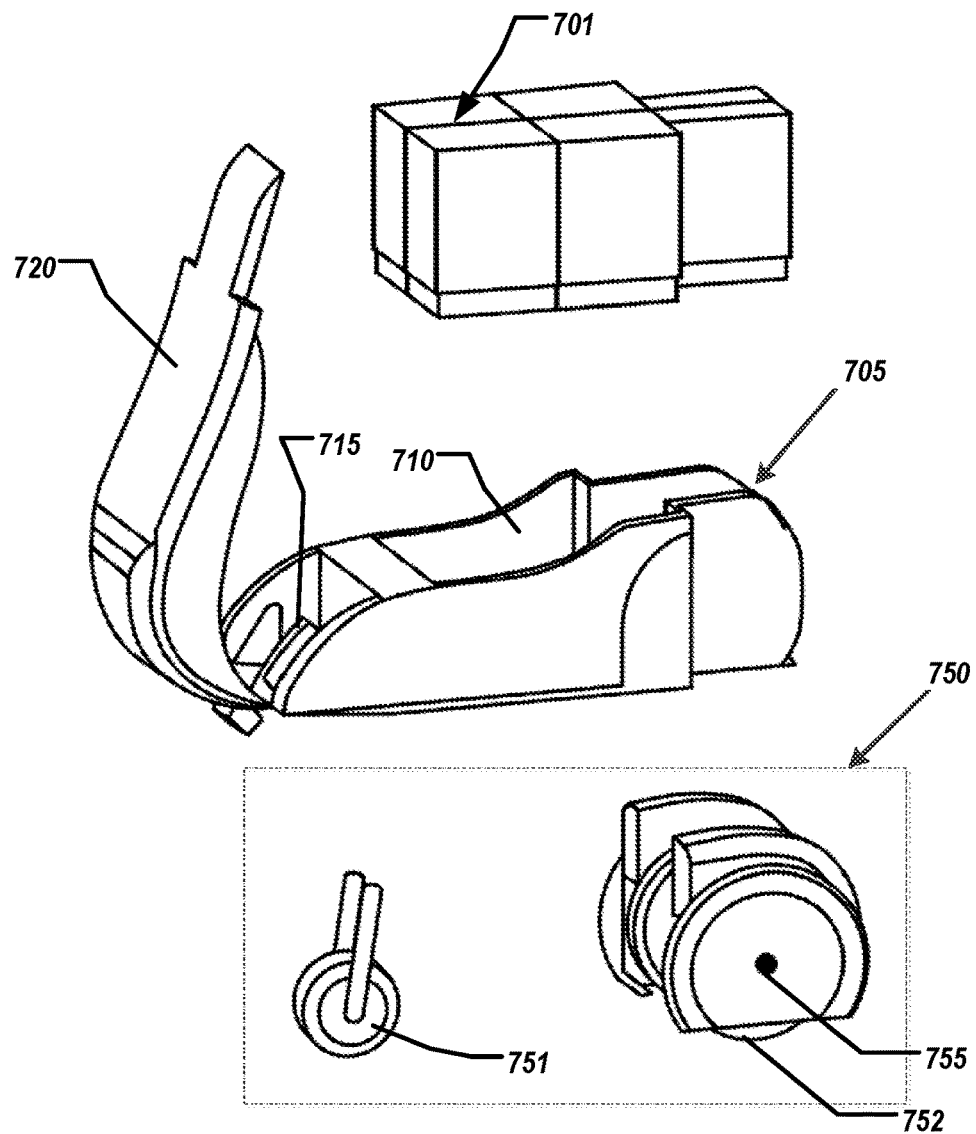
FIG. 7A is an exploded view of the energy module of FIG. 5 according to an aspect of the present disclosure.

FIG. 7A is an exploded view of the energy module 700, which is an implementation of the energy module 200. The energy module 700 includes a module housing 705 configured to include a battery compartment 710, an external port 715, and a cover 720. The battery compartment 710 is configured to hold one or more batteries 701. At one end of the battery compartment 710, an external port 715 is included that connected with the electrical system of the vehicle, the docking station 240, or external power supply. Thus, the module housing 705 is configured to provide power from the one or more batteries 701 to the electrical system of the vehicle. The energy module 700 also includes a cover 720 configured to cover the battery compartment, upon assembly of the batteries 701.

Figure 7B:
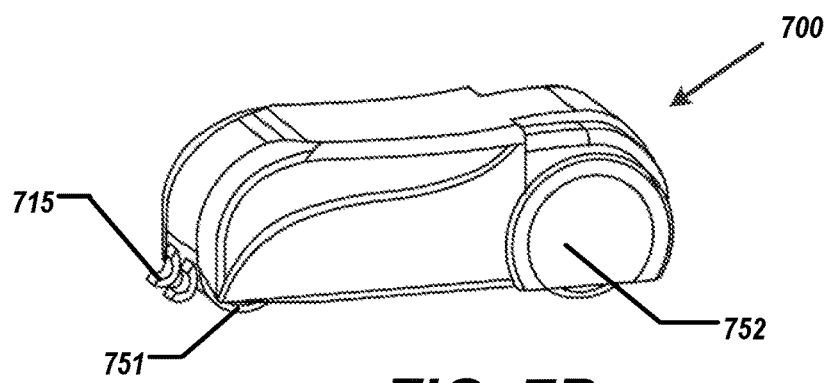
FIG. 7B illustrates an assembled energy module of FIG. 7A according to an aspect of the present disclosure.

The module housing 705 can also be configured to include a driving system 750 (which is an implementation of the driving system 212) including a front wheel 751 and at least one rear wheel 752 and/or 753 driven by a motor 755. The motor 755 can receive power from one or more batteries 701 and control movement signals, navigation signal or other driving related signals from the local controller, as discussed earlier. When the components of the energy module 700 are assembled, the cover 720 can be closed, as shown in FIG. 7B. In FIG. 7B, the energy module 700 takes a form of a trike. In closed state, the cover 720 can support a plate or carry other relatively light weight objects placed on the cover 720.

Figure 7C:
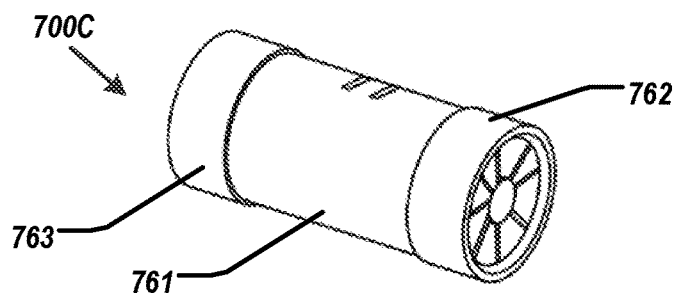
FIG. 7C illustrates an exemplary configuration of an energy module according to an aspect of the present disclosure.
Figure 7D:
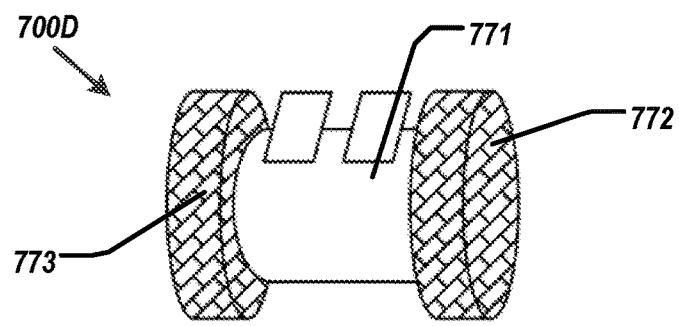
FIG. 7D illustrates another exemplary configuration of an energy module according to an aspect of the present disclosure.
Figure 7E:
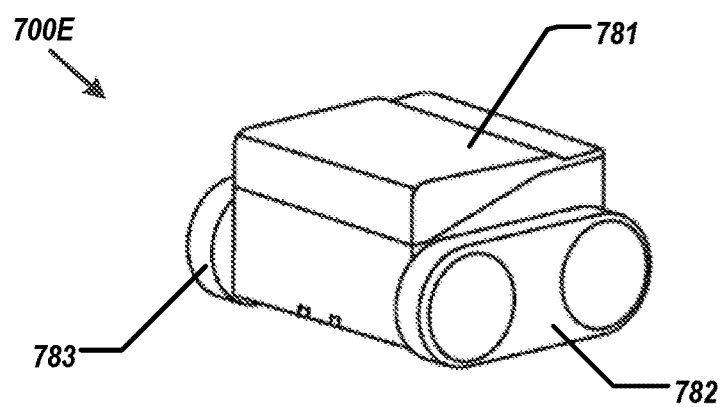
FIG. 7E illustrates a further exemplary configuration of an energy module according to an aspect of the present disclosure.

In some implementations, the energy module 200 can be configured in different manner, as illustrated in FIGS. 7C, 7D, and 7E. In FIG. 7C, the energy module 700C, which is an implementation of the energy module 200, can include a cylindrical body 761 having rotation assemblies 762 and 763 (e.g., wheels connected to a motor) at the ends of the cylinder. The rotation assemblies 762 and 763 can be controlled by the local controller, which can be an implementation of the controller 210. The rotation assembly can be formed over the cylindrical body 761. In some implementations, as illustrated in FIG. 7D, an energy module 700D, can include a cylindrical body 771 with larger rotation assemblies 772 and 773 attached at the end of the cylindrical body 771 instead of over the end of the cylindrical body 771. In some implementation, as illustrated in FIG. 7E, an energy module 700E, can have a tank like shape. The energy module 700E can include a rectangular body 781 that can hold one or more batteries and rotation assemblies 782 and 783 connected under the rectangular body 781, similar to a tank. The rotation assemblies 782 and 783 driven by a motor power by the one or more batteries and the motor can be controlled by a local controller, which can be an implementation of the controller 210.

FIG. 8 is an exemplary illustration of an energy module 800, which is an implementation of the energy module 700C. The energy module 800 can include coils 810 wound around the cylindrical body 801 to allow wireless charging of the batteries stored within the cylindrical body 801. The rotation assemblies 802 and 803 can be attached to the ends of the cylindrical body 801, as discussed with respect to FIG. 7C. The wireless charging technology can be adopted for other configurations of the energy modules such as the energy modules 700, 700C, 700D, and 700E to enable wireless charging of the batteries stored within the energy modules.

Figure 9:
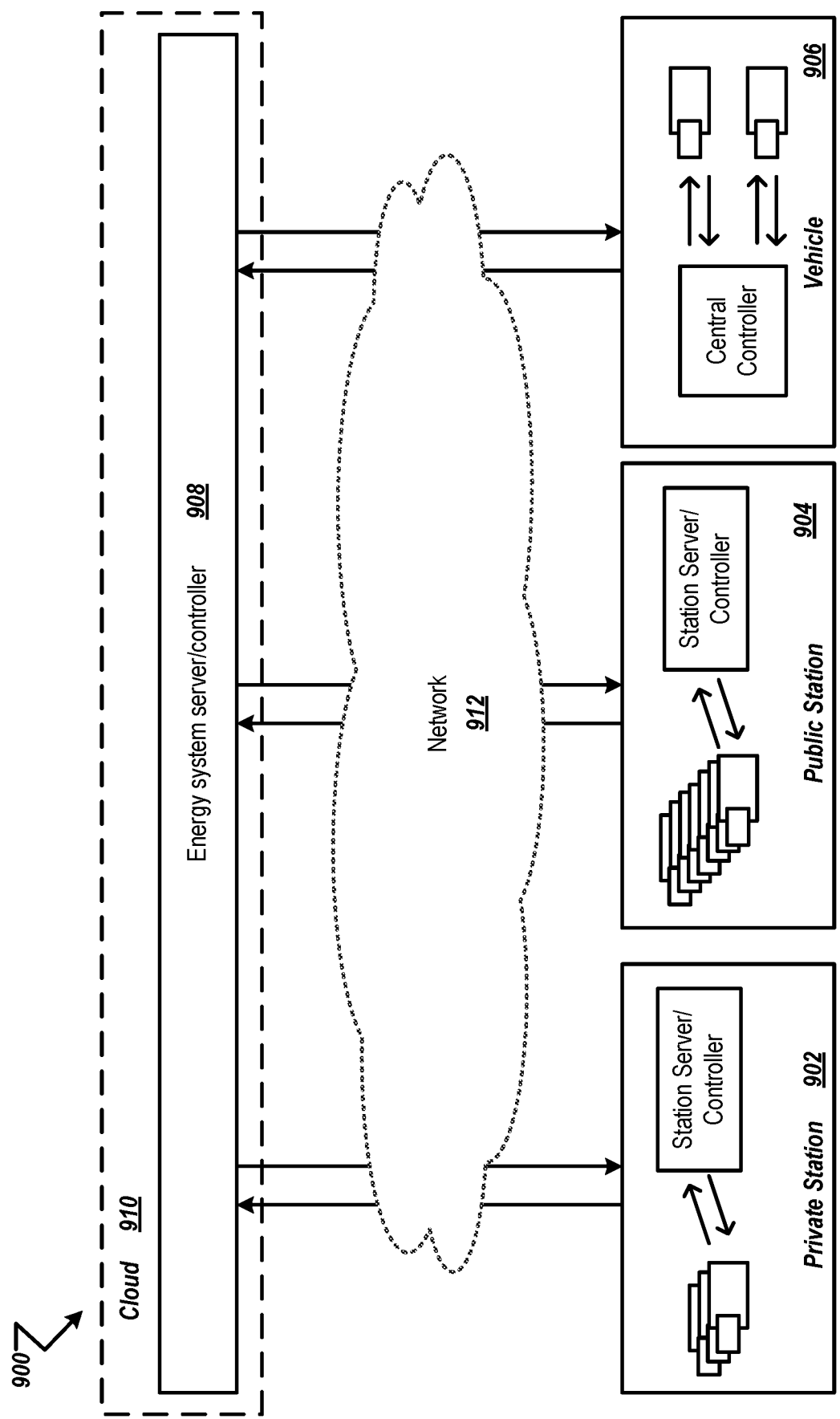
FIG. 9 is an exemplary diagram of a cloud-based energy module monitoring system according to an aspect of the present disclosure.

FIG. 9 is an exemplary diagram of a cloud-based energy module monitoring system 900. The cloud-based energy module monitoring system 900 includes an energy system server/controller 908 that can be implemented in a cloud computing environment 910 in order to provide increased scalability of an amount of data processed by the energy system server/controller 908.

The cloud computing environment 910 may include one or more resource providers, such as the energy system server/controller 908. Each resource provider may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider may be connected to any other resource provider in the cloud computing environment 910. In some implementations, the resource providers may be connected over a network 912. Each resource provider may be connected to one or more computing devices over the network 912, which may can be a cellular communication network, satellite communication network, or any other type of wireless communication network. For example, the computing devices can include servers/controllers associated with one or more entities monitored and controlled by the energy system server/controller 908. For example, the one or more entities can include private stations 902, public stations 904, or vehicles 906. For example, the private stations 902 can include charging stations or module storage sites that are located at private residences or on other types of private property that may include office buildings or mechanic garages. The public stations 904 can include charging stations or module storage sites that are located at publicly accessible sites that may include gas stations, shopping malls, hotels, etc. The vehicles 906 can include any type of EV that includes the modular energy management system 100 (FIG. 1) or any other type of energy management that has power provided by one or more of the energy modules 200 (FIG. 2).

The cloud computing environment 910 may include a resource manager. The resource manager may be connected to the resource providers and the computing devices over the network 912. In some implementations, the resource manager may facilitate the provision of computing resources by one or more resource providers to the computing devices of the private stations 902, public stations 904, or vehicles 906. The resource manager may receive a request for a computing resource from a particular computing device. The resource manager may identify one or more resource providers capable of providing the computing resource requested by the computing device. The resource manager may select a resource provider to provide the computing resource. The resource manager may facilitate a connection between the resource provider and a particular computing device. In some implementations, the resource manager may establish a connection between a particular resource provider and a particular computing device. In some implementations, the resource manager may redirect a particular computing device to a particular resource provider with the requested computing resource.

In one implementation, the cloud computing environment 910 may include GOOGLE Cloud Platform™, Amazon Web Services™ (AWS) platform, or any other public or private cloud computing environment. The processes associated with monitoring and/or controlling the private stations 902, public stations 904, and vehicles 906 can be executed on a computation processor, such as the GOOGLE Compute Engine. The energy system server/controller 908 can also include an application processor, such as the GOOGLE App Engine, that can be used as the interface with the private stations 902, public stations 904, and vehicles 906 to receive status data about the energy modules and output location information regarding locations of charging stations with a predetermined type of energy module or updated operational specifications and procedures for the energy modules. The energy system server/controller 908 also includes one or more databases. In some implementations, the one or more databases include a cloud storage database, such as the GOOGLE Cloud Storage, which stores processed and unprocessed module status data The energy system server/controller 908 receives status data for the charging stations and energy modules associated with the private stations 902, public stations 904, or vehicles 906 that are connected to the energy system server/controller via the network 912. Each of the private stations 902, public stations 904, and vehicles 906 as well as the associated energy modules can be uniquely identified by the energy system server/controller 908 by a serial number or other unique identifier. The servers/controllers at the private stations 902 and public stations 904 collect energy module charging data, which can include module status data for the energy modules that are charged at the private stations 902, which is then transmitted to the energy system server/controller 908. The module status data and charging station status data can include dates and times of module charges, amount of time it takes to charge the energy modules, energy grid cost and usage information at the locations of the private stations 902 and public stations 904, measured sensor data (e.g., voltage, current, etc.) at the energy modules during charging, etc. The central controller 128 of the vehicles 906, which can be the central controller 128 described previously (FIG. 1) that collects energy module status data for the energy modules supplying power to the modular energy management system 100. The module status data can include load demands on each of the energy modules, module discharge rates, voltage and current sensor data for each of the energy modules, and any other data that indicates a SOC or SOH of the energy modules. In some implementations, the controller 210 (FIG. 2) of individual energy modules can communicate directly with the energy system server/controller 908 via the network 912.

The energy system server/controller 908 can determine statistics and operational recommendations or modifications for the energy modules associated with the private stations 902, public stations 904, and vehicles 906 based on the received module status data and charging station data. For example, the energy system server/controller 908 can process the module status data for millions of energy modules associated with the private stations 902, public stations 904, and vehicles 906 to identify manufacturing deficiencies by measuring variations in performance in energy modules manufactured at various times or manufacturing sites. The energy system server/controller 908 can also identify inefficiencies in software executed by the server/controllers of the private stations 902, public stations 904, and vehicles 906. In addition, the energy system server/controller 908 uses the energy grid cost and usage information at the locations of the private stations 902 and public stations 904 to determine locations for the vehicles 906 to drive to for module charging.

If the energy system server/controller 908 identifies deficiencies in one or more energy modules that indicate imminent failure or are not correctable without outside intervention, the energy system server/controller 908 can output warnings to the private stations 902, public stations 904, or vehicles 906 associated with the defective energy modules. In some implementations, if the detected deficiency indicates imminent failure of the one or more defective energy modules, the energy system server/controller 908 can output a control signal to immediately shutdown the defective energy modules by issuing a control signal to the local controller at the energy modules, via the controller/server at the private stations 902 or public stations 904, or via the central controller 128 of the vehicles 906.

Based on the calculated statistics, the energy system server/controller 908 can also output firmware/software updates for the energy modules or charging stations to the private stations 902, public stations 904, and vehicles 906 via the network 912 to improve performance and efficiency of the energy modules or charging stations. In some implementations, in response to receiving a module replacement signal from the central controller 128 of one of the vehicles 906, the energy system server/controller 908 can output a location of one of the public stations 904 that is closest to a location of the vehicle 906 and/or has one or more on-hand replacement modules that provides for a module replacement time that is less than a predetermined threshold time. The energy system server/controller 908 can also output a module charging time associated with the location of the public station 904 that corresponds to a time when the energy grid costs for the location are at a cost that is less than a threshold cost.

Figure 10:
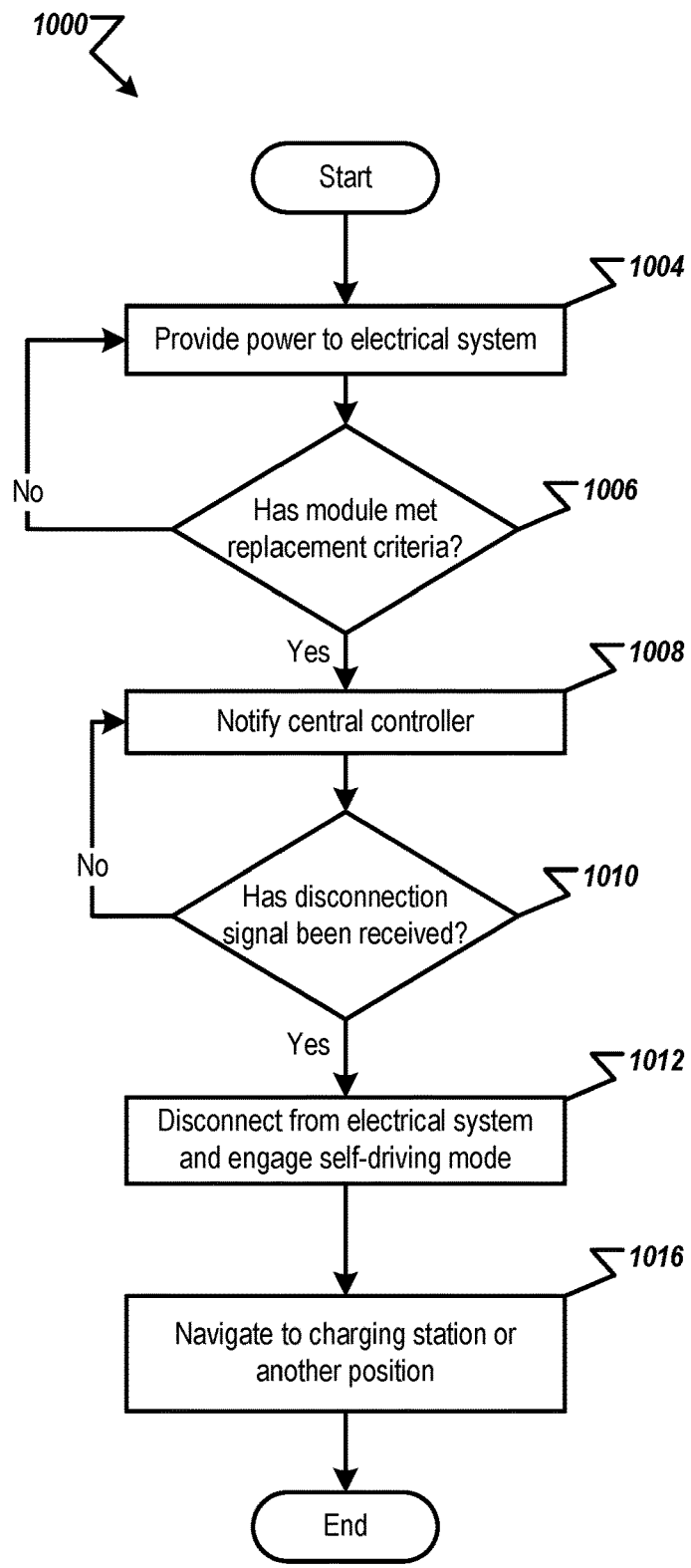
FIG. 10 is an exemplary flowchart of an energy module control process according to an aspect of the present disclosure.

FIG. 10 is an exemplary flowchart of an energy module control process 1000. The energy module control process 1000 is described herein with respect to the modular energy management system 100 (FIG. 1), the energy module 200 (FIG. 2), and the vehicle 600 (FIG. 6) but can also be applied to other types of self-driving energy modules that can be independently controlled.

At step 1004, the energy module 200, which is an implementation of the battery module 122 in the modular energy management system 100, provides power to the energy management bus 126 to power one or more electrical loads. In some implementations, the amount of power output from the energy module 200 and rate of discharge are based on control signals received from the central controller 128 of the modular energy management system 100.

At step 1006, the controller 210 of the energy module 200 determines whether one or more predetermined replacement criteria have been met at the energy module. The predetermined replacement criteria can include a predetermined SOC threshold or SOH threshold. For example, the predetermined SOC threshold may be a percentage of full charge, such as 50%, 60%, or any other percentage value. If the controller 210 determines that the one or more replacement criteria have been met, resulting in a "yes" at step 1006, then step 1006, then step 1008 is performed. Otherwise, if the one or more replacement criteria have not been met, resulting in a "no" at step 1006, then the process returns to step 1004, and the energy module 200 continues to provide power to the energy management bus 126 of the modular energy management system 100.

At step 1008, the controller 210 outputs the replacement status signal to the central controller 128 when one or more of the predetermined replacement criteria have been met. In addition, the controller 210 can output the current status of the energy module 110 to the central controller 128 at a predetermined frequency, and the central controller 128 can determine when the predetermined replacement criteria are met.

At step 1010, the controller 210 determines whether a disconnection signal has been received from the central controller 128. If the disconnection signal has been received from the central controller 128, resulting in a "yes" at step 1010, then step 1012 is performed. Otherwise, if the disconnection has not been received from the central controller 128, resulting in a "no" at step 1010, then the process returns to step 1008.

At step 1012, in response to receiving the disconnection signal from the central controller 128, the energy module 200 electrically disconnects from the electric terminals of the docking position in the docking station 240 and engages the self-driving mode. When a self-driving mode of the energy module 200 is engaged, the controller 210 of the energy module 200 outputs a control signal that causes clutch mechanism 508b to connect the wheel assembly 510b to the motor 506b so that the energy module 200 moves as the motor 506b spins while fan 504b also rotates.

At step 1016, the energy module 200 navigates to a charging station or another docking position in the docking station 240. In the navigation sub-mode of the self-driving mode, the controller 210 of the energy module 201 receives location information about the charging station or other predetermined location which the energy module 201 is navigating. The location information can include a detected beacon signal from the charging station that the energy module 201, a control signal received from the central controller 128 about the position of the charging station, and/or position coordinates of the charging station received from the central controller 128 or cloud-based energy module monitoring system. In some implementations, the local controller of the energy module includes positioning circuitry, such as a global positioning system (GPS) receiver that allows the local controller to determine the location of the charging station based on the received position coordinates. When the self-driving mode is engaged, the local controller issues control signals to the clutch mechanisms of the rotation assemblies (e.g., rotation assemblies 202 in FIG. 2) to connect the motor to the wheel assembly. The controller 210 also controls the speed and direction of rotation of each of the rotation assemblies in order to steer the energy module 201 to the charging station or other predetermined location.

Based on the configuration of the energy modules in the docking station 240, one or more of the energy modules may have to be repositioned within the docking station 240 in order to provide a path for another energy module to navigate out of the docking station 240 or into a predetermined docking position in the docking station 240. In response to receiving a repositioning control signal from the central controller 128, energy module 616 engages a repositioning sub-mode of the self-driving mode. While in the repositioning sub-mode, the energy module 616 exits the docking station 240 via the driving surface provided by the ramp 540 and subsequently navigates back to a predetermined docking position in the docking station 240 once the energy module 512 has exited the docking station 240. The energy modules stored in the docking station 240 can also be manually removed/disconnected or replaced/connected from the docking station 240.

Figure 11:
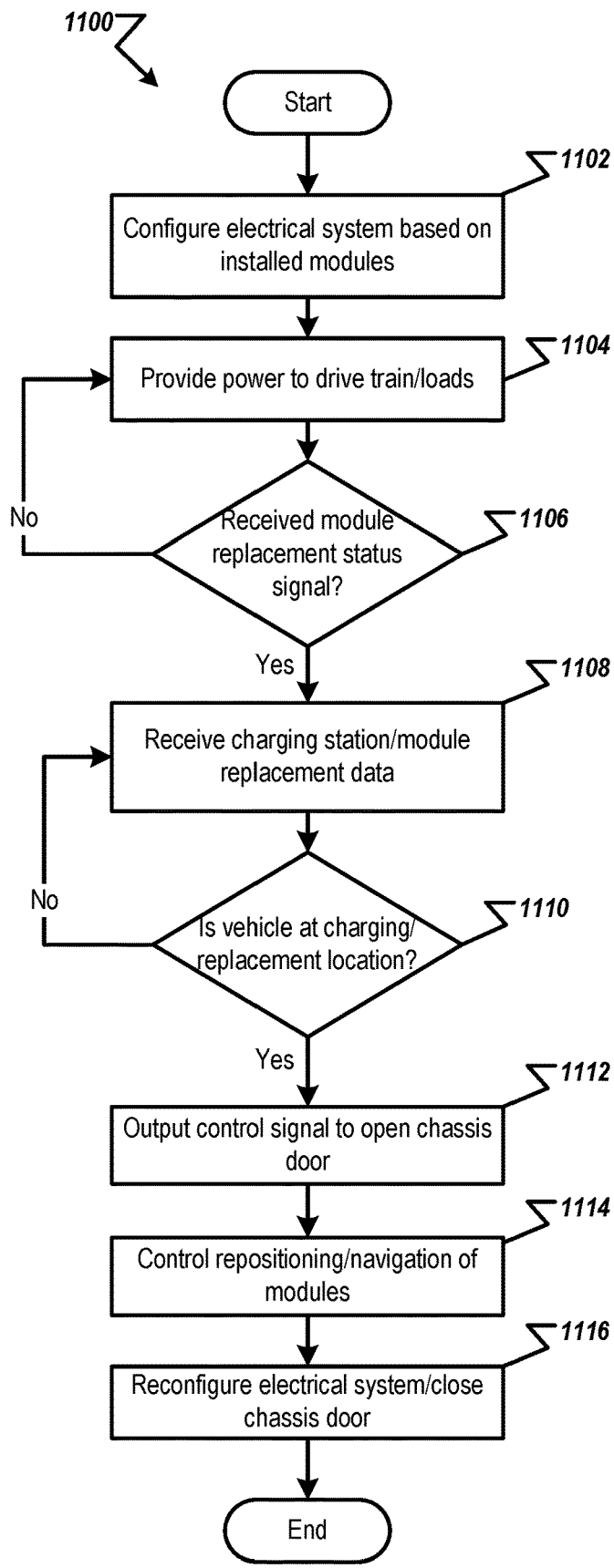
FIG. 11 is an exemplary flowchart of an energy management system control process according to an aspect of the present disclosure.

FIG. 11 is an exemplary flowchart of an energy management system control process 1100. The energy management system control process 1100 is described herein with respect to the modular energy management system 100 (FIG. 1), the energy module 200 (FIG. 2), and the vehicle 600 (FIG. 6) but can also be applied to other types of self-driving energy modules that can be independently controlled.

At step 1102, the central controller 128 configures the modular energy management system 100 based on characteristics of the energy modules connected to the electric terminals in the docking stations of the docking station 240. For example, the energy modules can include the battery modules 122 of the modular energy management system 100. At step 1104, the connected energy modules provide power to the vehicle drive train and various electrical loads of the modular energy management system 100.

At step 1106, the central controller 128 determines whether a replacement status signal has been received from one of the energy modules. If a replacement status signal has been received, resulting in a "yes" at step 1106, then step 1108 is performed. Otherwise, if a replacement status signal has not been received, resulting in a "no" at step 1106, then the process returns to step 1104.

At step 1108, the central controller 128 receives charging station/module replacement data from the energy system server/controller 908 of the cloud-based energy module monitoring system 900. For example, the charging station/module replacement data can include a position data indicating a location of a charging station that is closest to the vehicle with the energy module that has met the replacement criteria or has one or more on-hand modules that are compatible with the modular energy management system 100. In some implementations, the cloud-based energy module monitoring system 900 can also communicate a charging connection time that corresponds to a time where grid energy costs are lowest or less than a predetermined threshold cost.

At step 1110, the central controller 128 determines whether the vehicle 600 is at or within a predetermined distance of the charging station/module replacement location. For example, the central controller 128 determines that the vehicle 600 is at the charging station location based on a location signal received from a navigation system of the vehicle 600. If the vehicle 600 is at the charging station/module replacement location, resulting in a "yes" at step 1110, then step 1112 is performed. Otherwise, if the vehicle 600 is not at the charging station/module replacement location, resulting in a "no" at step 1110, then the process returns to step 1108.

At step 1112, the central controller 128 outputs a control signal to open the ramp 540 of the docking station 240. The central controller 128 can output the control signal to engage an actuator to open the ramp 540 based on predetermined opening criteria. For example, the predetermined opening criteria can include receiving a module replacement signal from one of the energy modules, determining that the vehicle 600 is within a predetermined distance of a module charging/replacement station, and determining that the vehicle 600 is in a parked state or the engine is off, the central controller 128 issues a control signal to open the ramp 540 of the docking station 240. When in an open position, the ramp 540 provides a driving surface between the docking station 240 and a predetermined location for the one or more energy modules operating in the self-driving mode, such as a module charging/replacement station.

At step 1114, the central controller 128 controls the navigation of the energy modules between the module 602 chassis and the predetermined location as well as the repositioning of the energy modules. If energy module 606 (FIG. 6) has met the predetermined replacement criteria, the ramp 540 of the module chassis 302 is open, and the energy management system 100 has been configured for standby operations, the central controller 128 issues the disconnection signal to the energy module 606 along with a control signal to engage a self-driving mode in order to navigate to a charging station. In response to receiving the control signals, the energy module 606 disconnects from the energy management bus and engages the navigation sub-mode of the self-driving mode.

The central controller 128 also outputs a repositioning control signal to one or more energy modules in order to provide a path of travel for an energy module 512 being replaced. For example, in response to receiving the repositioning control signal, energy module 616 engages a repositioning sub-mode of the self-driving mode. While in the repositioning sub-mode, the energy module 616 exits the docking station 240 via the driving surface provided by the ramp 540 and subsequently navigates back to a predetermined docking position in the docking station 240 once the energy module 512 has exited the docking station 240.

The energy module 501 (FIG. 6) represents an energy module operating in the self-driving mode that is navigating to one of the docking positions in the docking station 240. For example, the energy module 501 may be a replacement energy module and/or charged energy module that is navigating to docking station 240 from the charging station. The energy module 501 also navigates to the docking station 240 based on received location information about the docking station 240 and/or predetermined docking position to which the energy module 501 is assigned. In some implementations, the central controller 128 determines the predetermined docking position for the energy module 501 based on a current module status of other energy modules providing power to the energy management system 100 as well as power demands of the electrical loads supplied by the modular energy management system 100. When the predetermined docking position is determined, the central controller 128 outputs a control signal to trigger the electric terminals of the predetermined docking position to output a beacon signal that is detected by the energy module 501. The local controller 210 of the energy module 501 controls navigation of the energy module 501 to the predetermined docking position based on the detected beacon signal from the electric terminals for the predetermined docking position.

At step 1116, the central controller 128 reconfigures the energy modules in the docking station 240 for an operational mode and closes the ramp 540 of the docking station 240. The central controller 128 outputs a control signal to engage an actuator to close the ramp 540 based on predetermined closing criteria. The predetermined closing criteria can include determining that a predetermined number of energy modules are in one or more of the docking positions and are electrically connected to the energy management bus via the electric terminals.

Figure 12:
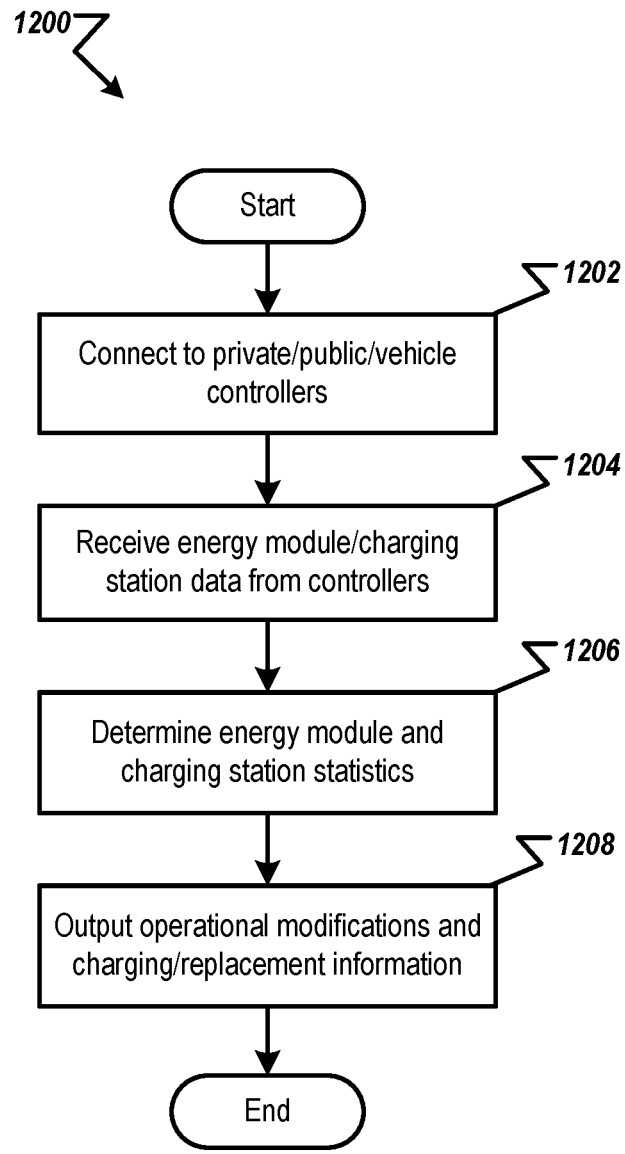
FIG. 12 is an exemplary flowchart of an energy module monitoring system control process according to an aspect of the present disclosure.

FIG. 12 is an exemplary flowchart of an energy module monitoring system control process 1200. The energy module monitoring system control process 1200 is described herein with respect to the cloud-based energy module monitoring system 900 (FIG. 9), but can also be applied to other types and configurations of energy module monitoring systems.

At step 1202, the energy system server/controller 908 connects to one or more computing devices associated with the private stations 902, public stations 904, and/or vehicles 906 via the network 912, which may be a cellular communication network, satellite communication network, or any other type of wireless communication network. For example, the computing devices can include servers/controllers associated with one or more entities monitored and controlled by the energy system server/controller 908. When the connection between private stations 902, public stations 904, and/or vehicles 906 and the energy system server/controller 908 is established, the energy system server/controller 908 identifies the computing devices and associated energy modules based on a unique identifier, such as a serial number.

At step 1204, the energy system server/controller 908 receives status data for the charging stations and energy modules associated with the private stations 902, public stations 904, or vehicles 906 that are connected to the energy system server/controller via the network 912. Each of the private stations 902, public stations 904, and vehicles 906 as well as the associated energy modules can be uniquely identified by the energy system server/controller 908 by a serial number or other unique identifier. The servers/controllers at the private stations 902 and public stations 904 collect energy module charging data, which can include module status data for the energy modules that are charged at the private stations 902, which is then transmitted to the energy system server/controller 908. The module status data and charging station status data can include dates and times of module charges, amount of time it takes to charge the energy modules, energy grid cost and usage information at the locations of the private stations 902 and public stations 904, measured sensor data (e.g., voltage, current, etc.) at the energy modules during charging, etc. The central controller of the vehicles 906, which can be the central controller 128 described previously (FIG. 1) that collects energy module status data for the energy modules supplying power to the modular energy management system 100. The module status data can include load demands on each of the energy modules, module discharge rates, voltage and current sensor data for each of the energy modules, and any other data that indicates a SOC or SOH of the energy modules. In some implementations, the controller 210 (FIG. 2) of individual energy modules can communicate directly with the energy system server/controller 908 via the network 912.

At step 1206, the energy system server/controller 908 determines statistics and operational recommendations or modifications for the energy modules associated with the private stations 902, public stations 904, and vehicles 906 based on the received module status data and charging station data. For example, the energy system server/controller 908 can process the module status data for millions of energy modules associated with the private stations 902, public stations 904, and vehicles 906 to identify manufacturing deficiencies by measuring variations in performance in energy modules manufactured at various times or manufacturing sites. The energy system server/controller 908 can also identify inefficiencies in software executed by the server/controllers of the private stations 902, public stations 904, and vehicles 906. In addition, the energy system server/controller 908 uses the energy grid cost and usage information at the locations of the private stations 902 and public stations 904 to determine locations for the vehicles 906 to drive to for module charging.

At step 1208, the energy system server/controller 908 outputs operational modifications and/or charging/replacement information to the private stations 902, public stations 904, and vehicles 906. For example, if the energy system server/controller 908 identifies deficiencies in one or more energy modules that indicate imminent failure or are not correctable without outside intervention, the energy system server/controller 908 can output warnings to the private stations 902, public stations 904, or vehicles 906 associated with the defective energy modules. In some implementations, if the detected deficiency indicates imminent failure of the one or more defective energy modules, the energy system server/controller 908 can output a control signal to immediately shutdown the defective energy modules by issuing a control signal to the local controller at the energy modules, via the controller/server at the private stations 902 or public stations 904, or via the central controller of the vehicles 906.

Based on the calculated statistics, the energy system server/controller 908 can also output firmware/software updates for the energy modules or charging stations to the private stations 902, public stations 904, and vehicles 906 via the network 912 to improve performance and efficiency of the energy modules or charging stations. In some implementations, in response to receiving a module replacement signal from the central controller of one of the vehicles 906, the energy system server/controller 908 can output a location of one of the public stations 904 that is closest to a location of the vehicle 906 and/or has one or more on-hand replacement modules that provides for a module replacement time that is less than a predetermined threshold time. The energy system server/controller 908 can also output a module charging time associated with the location of the public station 904 that corresponds to a time when the energy grid costs for the location are at a cost that is less than a threshold cost.

Aspects of the present disclosure are directed to a modular energy management system that includes lightweight, self-driving energy modules that are able to independently navigate to charging stations or other locations. The energy modules described herein are significantly improved over energy modules used in HV's that are heavy and require manual installation and replacement. The modularity of the energy modules and the adaptability of the modular energy management system also allows for interchangeability with other energy modules that are compatible with the modular energy management system. In addition, the energy modules can be used in multiple types of charging and transportation applications.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 13:
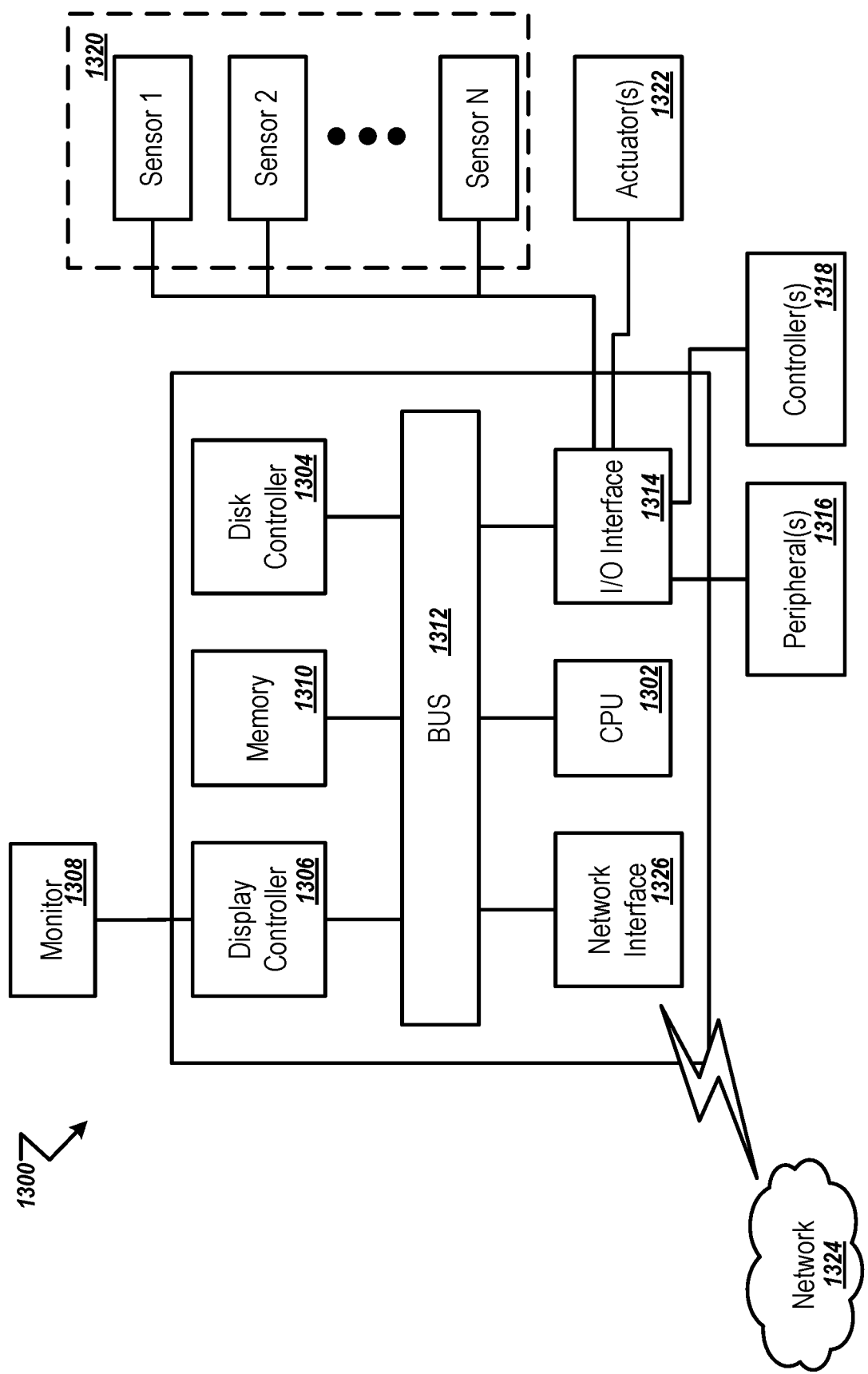
FIG. 13 schematically illustrates a processing system, such as a controller and/or a computer system according to an aspect of the present disclosure.

FIG. 13 illustrates an exemplary processing system 1300 (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle or as a server in a cloud computing environment. For example, the processing system 1300 can be the controller 210 in one of the energy modules, the central controller 128 of the modular energy management system 100, or a server/controller of the private stations 902 or public stations 904. The processing system 1300 can also be the energy system server/controller 908 of the cloud-based module monitoring system 900.

The exemplary processing system 1300 can be implemented using one or more microprocessors or the equivalent, such as a central processing unit (CPU) 1302 and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller 1304, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU 1302. Control circuitry provided by one or more processors in a multi-processing arrangement may also be employed to execute sequences of instructions contained in memory 1310. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller 1306 to a monitor 1308. The display controller 1306 preferably includes at least one graphic processing unit, which can be provided by a plurality of graphics processing cores, for improved computational efficiency. The display controller 1306 or portions thereof can also be incorporated into the CPU 1302. Additionally, an I/O (input/output) interface 1314 is provided for inputting signals and/or data from a microphone, speakers, cameras, a mouse, a keyboard, a touch-based display or pad interface, etc., which can be connected to the I/O interface as a peripheral 1316. For example, a keyboard or a pointing device for controlling parameters of the various processes or algorithms of this disclosure can be connected to the I/O interface to provide additional functionality and configuration options, or control display characteristics. Moreover, the monitor 1308 can be provided with a touch-sensitive or gesture-detecting interface for providing a command/instruction interface.

In an explary implementation, the I/O interface is provided for inputting sensor data from Sensors 1, 2 . . . N 1320. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers 1318 that enable a user to control the configuration of the modular energy management system 100. For example, the user can use the controller 1318 to select energy modules to provide power to one or more auxiliary electrical loads when the modular energy management system is in standby mode. The I/O interface can also provide an interface for outputting control signals to one or more actuators 1322 to control various actuated components, including DC-DC conversion circuitry and other circuitry in the modular energy management system 100. In some implementations, the actuators 1320 send control signals to align the clutch mechanisms of the rotation assemblies 202 to connect the wheel assemblies 214 to the motor 208 of the energy module 200.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network 1324, such as the Internet or a local intranet, via a network interface 1326 for the transmission or reception of data, including controllable parameters. The network interface 1326 can include one or more IEEE 802 compliant circuits. A central bus 1312 is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory 1310 and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

Figure 14:
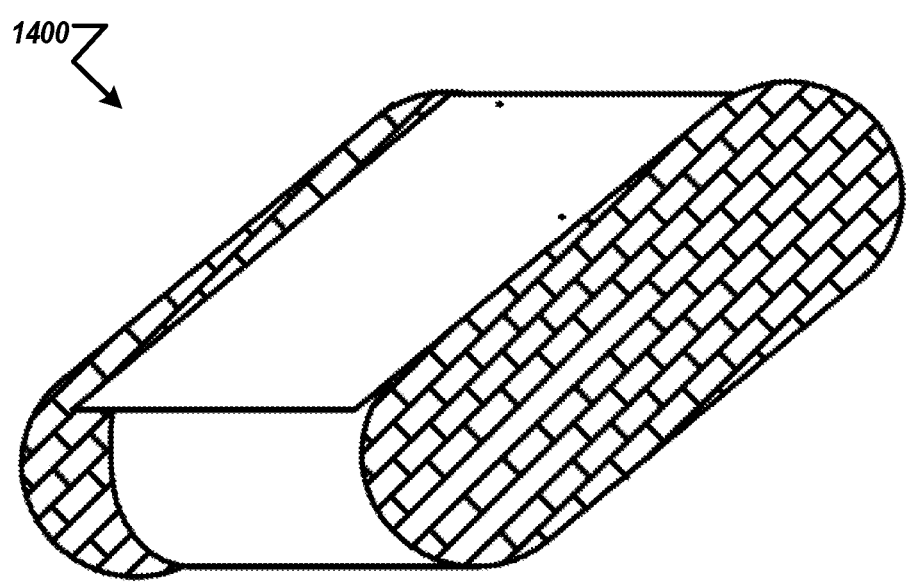
FIG. 14 illustrates a first configuration of an energy module for transporting heavy objects according to an aspect of the present disclosure.
Figure 15A:
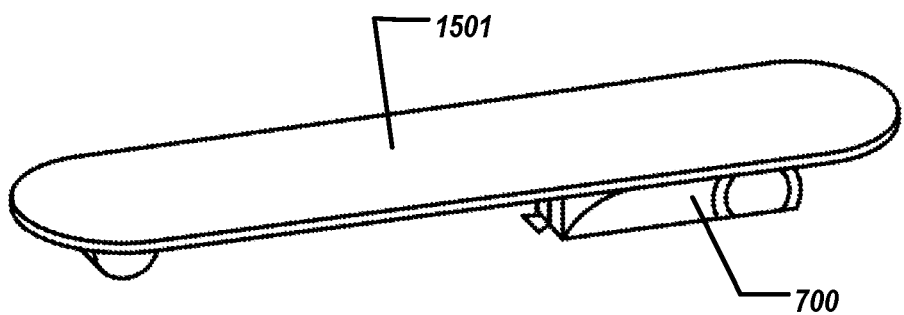
FIG. 15A illustrates a first usage configuration of the energy module of FIG. 5 according to an aspect of the present disclosure.
Figure 15B:
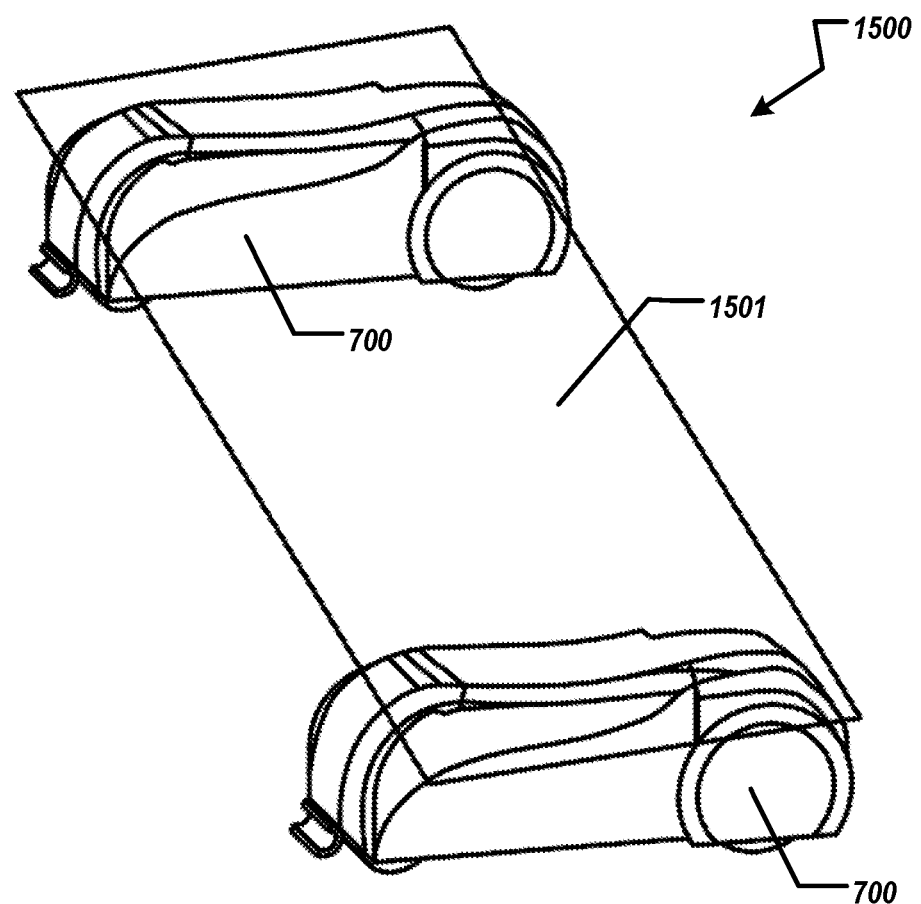
FIG. 15B illustrates a second usage configuration of the energy module of FIG. 5 according to an aspect of the present disclosure.

The energy module 200 can have several different configurations as illustrated FIGS. 14, 15, 16A, 16B and 16C. FIG. 14 is an exemplary configuration of the energy module 1400 including a multiple cylindrical energy modules similar to the cylindrical energy module 700C. Multiple energy modules 700C can be combined into a single energy module 1400 and further adapted to include one driving system. Such energy module 1400 can be used for heavy duty transportation applications. In another configuration, in FIG. 15A, a skateboard-like plate 1501 can be connected to the energy module 700. In another example, the plate 1501 can be connected to two or more energy modules 700, as illustrated in FIG. 15B. Furthermore, the two or more energy modules 700 can be synchronized to act in a coordinated manner in the self-driving mode. The plate 1501 attachment can be physically connected to the energy modules 700 as well as electrically connected via the external port 715 shown in FIG. 7A.

Figure 16A:
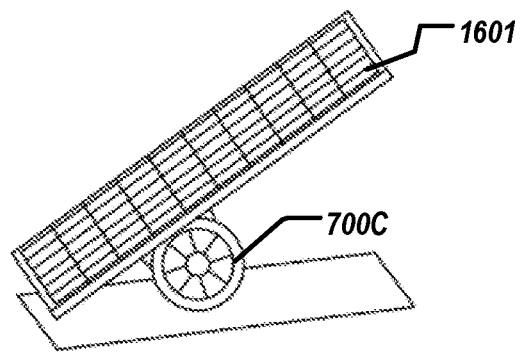
FIG. 16A illustrates a cylindrical energy module with a solar panel according to an aspect of the present disclosure.
Figure 16B:
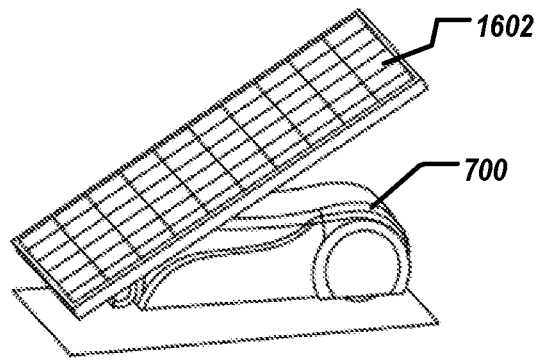
FIG. 16B illustrates an energy module of FIG. 5 with a solar panel according to an aspect of the present disclosure.
Figure 16C:
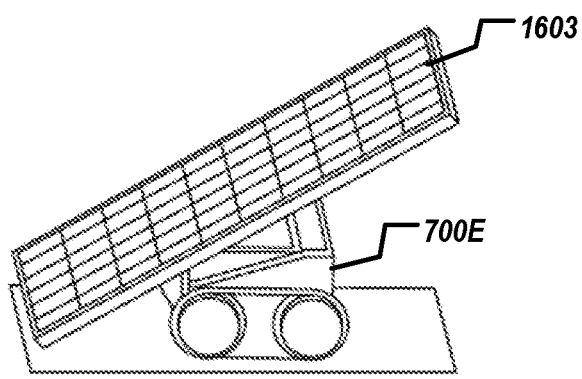
FIG. 16C illustrates a tank energy module with a solar panel according to an aspect of the present disclosure.

In another configuration of the energy module 200 solar panels can be included to charge the batteries within the energy module 200. For example, FIG. 16A illustrates the cylindrical energy module 700C connected to a solar panel 1601. The solar panel 1601 can be used to charge the batteries within the energy module 700C. In FIG. 16B, the energy module 700 is connected to the solar panel 1602. The solar panel 1602 can be used to charge the batteries within the energy module 700. In FIG. 16C, the energy module 700E is connected to the solar panel 1603. The solar panel 1603 can be used to charge the batteries within the energy module 700E. Furthermore, the local controller of the energy modules 700, 700C and 700E can be configured to control an orientation of the solar panels 1601, 1602, and 1603 to all maximum exposure to sunlight, thereby increase a charging efficiency.

Figures 17A, 17B:
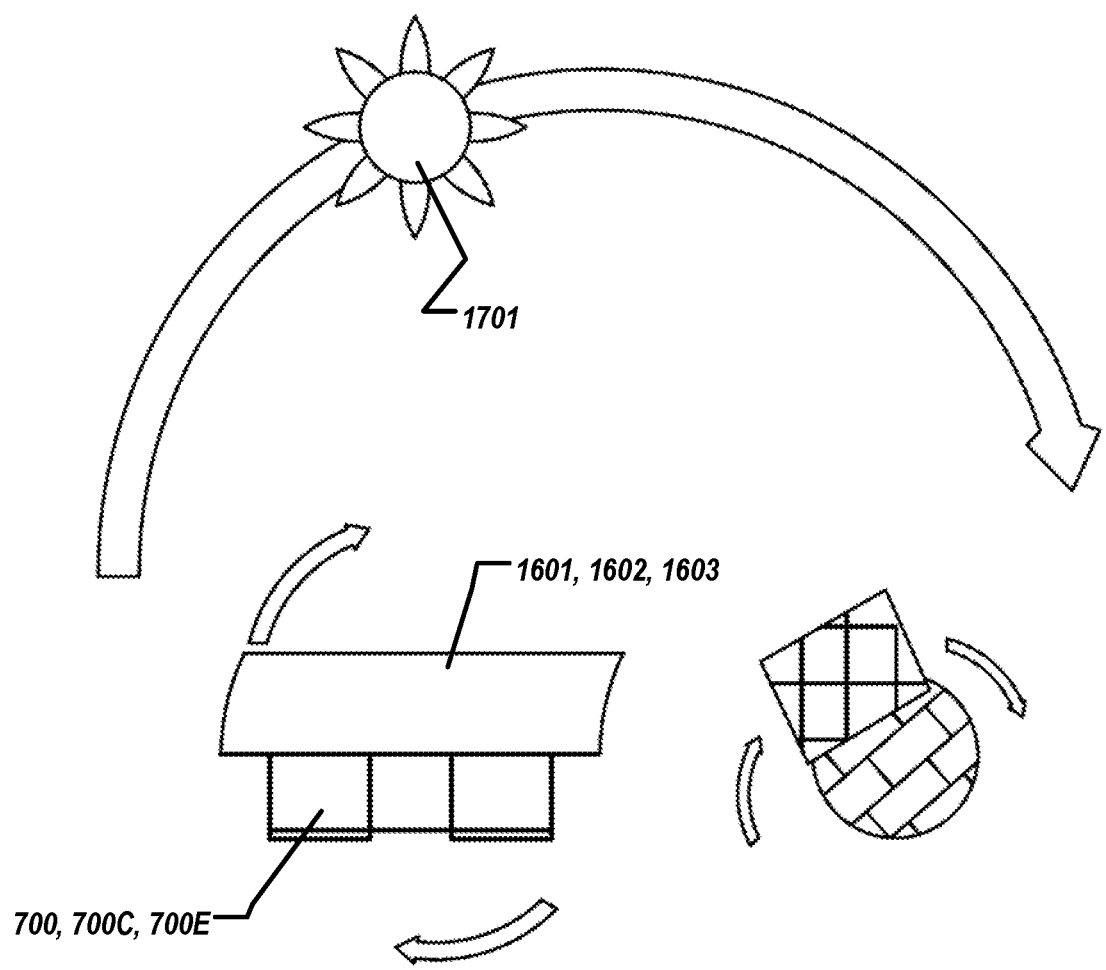
FIGS. 17A and 17B illustrate a positioning of a solar panel attached to an energy module according to an aspect of the present disclosure.

FIG. 17A is an example of the energy module 700, 700C, or 700E with orientation control of the solar panels 1601, 1602, or 1603 and 17B is a side view of the example in FIG. 17A. The solar panels 1601, 1602, or 1603 can be connected to the to the respective energy modules via the respective external port. The solar panel 1601 (or 1602, or 1603) receives solar energy from the sun 1701 when the sun rays are incident on the solar panel at a certain angle. For maximum exposure to the sunlight, the solar panel should face the sun. However, the relative position of the sun 1701 changes with time during the day which in turn reduces the sunlight incident on the solar panel, thus reducing the charging efficiency. To maintain a maximum exposure to the sunlight, the solar panel should be rotated as well. In some implementations, the local controller can be configured to determine an optimum position of the solar panel 1601 based on a time of the day, a location away from a shade, or other locations having access to the sunlight. The optimum position can be a different location (e.g., a predetermined location where the sunlight is received during the day) or a different orientation of the solar panel. The optimum position can be a predetermined position (i.e., a location/orientation) or real-time position (i.e., a location/orientation) determined dynamically based on a time of the day and/or an amount of electrical energy produced. The real-time position can be determined, for example, by driving the energy module to different locations and monitoring, via the local controller, the amount of electrical energy produced by the solar panel 1601 at each location for a particular time period. A location where a maximum electrical energy is produced can be the optimum position of solar panel of the energy module. Alternatively or in addition, the solar panel 1601 can be oriented at different angles at a particular location and the amount of electrical energy produced at a particular orientation can be monitored by the local controller.

As such, the location controller can orient the solar panel 1601 in the direction of maximum sunlight either by rotating the solar panel's orientation or by driving the drone to a location of more sunlight. The orientation of solar panel 1601 can be changed by installing the solar panel on a tilting mechanism and moving the tilting mechanism via actuators, where the actuators receive orientation signal from the local controller.

Figure 18:
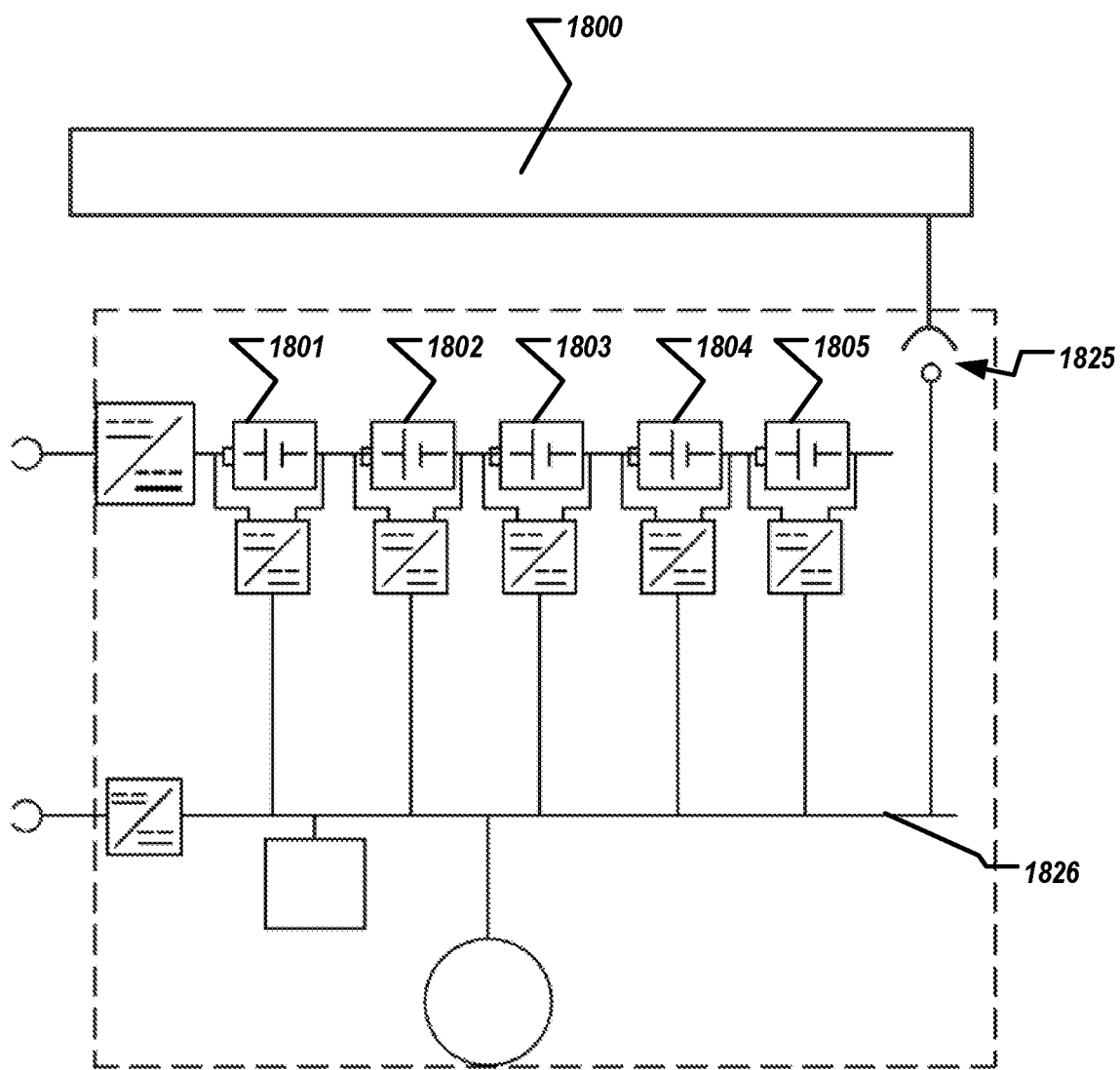
FIG. 18 a schematic of an energy module attached to a solar panel according to an aspect of the present disclosure.

The electrical schematic of the solar panel connected to the energy module 200 is further illustrated in FIG. 18. In FIG. 18, the solar panel 1800, which is an implementation of the solar panel 1601, 1602, or 1603, is electrically coupled via an electrical coupling 1825. The electrical coupling 1825 establishes a connection to a bus 1826 which is connected to the batteries 1801, 1802, 1803, 1804, and 1805. The solar panel 1800 converts the solar energy into electric energy which is further transferred to the batteries 1801-1805 via the bus 1826.

According to one case study, the results of the using the solar panel are as follows. Consider a rectangular solar panel of size approximately 2m×1m, voltage capacity of approximately 24V, and power generation capacity of approximately 340W, and a weight approximately 20kg is connected to the energy module of size approximately 1m, total voltage capacity of approximately 48V, power generation capacity of approximately 340W, weight of approximately 20kg and a total energy capacity of approximately 7kWh. The energy module further includes a driving system that requires a power of approximately 100W, has a weight of approximately 10kg and can drive a payload of greater than approximately 50kg. For the aforementioned configuration, the estimated results for the energy module indicate that a full charging time is approximately 20 hours, i.e., the energy module can be fully charged in approximately 20 hours using the solar panel. The maximum energy produced via the solar panels can be approximately 2.4kWh, which corresponds to 340Wh for 7 hours a day. The maximum charging energy from the solar cell for driving system is approximately 35% (i.e., 2.4lWh of solar energy divided by the total capacity of 7kWh).

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
one or more energy modules configured to output power to an energy management bus based on load demands wherein an energy module of the one or more energy modules includes
one or more energy cells enclosed within a module housing configured to provide the power to the energy management bus,
a driving system including a single front wheel, at least one rear wheel, and a motor attached to the module housing that are configured to transport the energy module, and
a local controller with first circuitry configured to
control an amount of power output from the one or more energy cells to the energy management bus,
engage a self-driving mode of the energy module in response to receiving a disconnection signal from a central controller, and
control movement of the energy module in the self-driving mode to a predetermined location via the motor of the driving system;
the central controller including second circuitry configured to
receive a current module status from the one or more energy modules, and
control a configuration of the one or more energy modules providing power to the energy management bus based on the current module status; and
a chassis configured to enclose a plurality of energy modules, the chassis including a ramp configured to allow each of the plurality of energy module to enter and exit the chassis independently of others of the plurality of energy modules,
wherein at least one of the front wheel and the rear wheel is detachably coupled to the motor via a clutch mechanism and configured to roll on the ramp of the chassis in order to provide the rotational movement of the energy module in response to the rotation of the motor.

2. The system of claim 1, wherein the driving system includes
the motor configured to receive electrical power from the one or more energy cells.

3. The system of claim 2, wherein the first circuitry is further configured to disconnect at least one of the front wheel and the rear wheel from the motor via the clutch mechanism when the energy module is not in the self-driving mode.

4. The system of claim 1, wherein the first circuitry is further configured to output a replacement status signal to the central controller in response to determining that current module status of the energy module meets one or more replacement criteria.

5. The system of claim 4, wherein the one or more replacement criteria include at least one of a predetermined state of charge (SOC) threshold or a predetermined state of health (SOH) threshold for the one or more energy cells.

6. The system of claim 1, wherein the first circuitry is further configured to engage a navigation sub-mode of the self-driving mode wherein the first circuitry is further configured to navigate the energy module to the predetermined location that corresponds to a charging station location.

7. The system of claim 6, wherein the first circuitry is further configured to determine the charging station location based on location data received from the second circuitry of the central controller.

8. The system of claim 6, wherein the first circuitry is further configured to determine the charging station location based on a beacon signal received from the charging station.

9. The system of claim 1, further comprising a module chassis configured to hold the one or more energy modules at one or more docking positions within the module chassis.

10. The system of claim 9, wherein the one or more docking positions include at least one electrical terminal configured to electrically connect the one or more energy modules to the energy management bus.

11. The system of claim 10, wherein the at least one electrical terminal includes a wireless power transceiver configured to wirelessly transfer power between the one or more energy modules and the energy management bus.

12. The system of claim 9, wherein the second circuitry of the central controller is further configured to control a position of the ramp of the module chassis.

13. The system of claim 12, wherein the second circuitry is further configured to output the disconnection signal to the one or more energy modules in response to determining that the ramp of the module chassis is in an open position.

14. The system of claim 13, wherein the ramp of the module chassis is configured to provide a driving surface between the module chassis and the predetermined location for the one or more energy modules operating in the self-driving mode when the ramp is in an open position.

15. The system of claim 9, wherein a first circuitry of an energy module in a first docking position is further configured to engage a repositioning sub-mode of the self-driving mode wherein the first circuitry is further configured to navigate the energy module to the predetermined location that corresponds to a second docking position within the module chassis.

16. The system of claim 15, wherein the first circuitry is further configured to navigate the energy module to the second docking position within the module chassis based on a beacon signal received from the second docking position.

17. The system of claim 1, wherein the second circuitry is further configured to determine the predetermined location to which the energy module navigates based on charging/replacement location information received from a cloud-based energy module monitoring system.

18. The system of claim 1, wherein the energy module further includes a solar panel electrically coupled to charge the one or more energy cells via an external port of the module housing.

19. The system of claim 1, wherein the chassis is located at a rear of a vehicle, and the one or more energy modules are configured to power the vehicle via the energy management bus.

20. A method comprising:
controlling, via first circuitry of a local controller, an amount of power output from one or more energy cells enclosed within a module housing of an energy module of one or more energy modules to an energy management bus of an electrical system;
engaging, via the first circuitry, a self-driving mode of the energy module in response to receiving a disconnection signal from a central controller;

controlling, via the first circuitry, movement of the energy module in the self-driving mode to a predetermined location via the motor of the driving system attached to the module housing that are configured to provide rotational movement for the energy module;

receiving, at second circuitry of a central controller, a current module status from the one or more energy modules; and controlling a configuration of the one or more energy modules providing power to the energy management bus based on the current module status received from the one or more energy modules, wherein a plurality of energy modules are enclosed in a chassis, and the chassis includes a ramp configured to allow each of the plurality of energy module to enter and exit the chassis independently of others of the plurality of energy modules, each of the plurality of energy modules includes a driving system including a single front wheel, at least one rear wheel, and a motor attached to the module housing that are configured to transport the energy module, and wherein at least one of the front wheel and the rear wheel is detachably coupled to the motor via a clutch mechanism and configured to roll on the ramp of the chassis in order to provide the rotational movement of the energy module in response to the rotation of the motor.

* * * * *